US012359477B1

(12) United States Patent
Liang et al.

(10) Patent No.: US 12,359,477 B1
(45) Date of Patent: Jul. 15, 2025

(54) WINDOW SASH LOCK CONFIGURED FOR SCREWLESS SNAP-IN INSTALLATION ONTO A MEETING RAIL

(71) Applicant: Vision Industries Group, Inc., Somerset, NJ (US)

(72) Inventors: Luke Liang, Somerset, NJ (US); Glen Paesano, Point Pleasant Beach, NJ (US)

(73) Assignee: VISION INDUSTRIES GROUP, INC.

( * ) Notice: Subject to any disclaimer, the term of this patent is extended or adjusted under 35 U.S.C. 154(b) by 237 days.

(21) Appl. No.: 18/330,539

(22) Filed: Jun. 7, 2023

Related U.S. Application Data

(60) Provisional application No. 63/352,651, filed on Jun. 16, 2022.

(51) Int. Cl.
*E05C 3/04* (2006.01)
*E05C 1/10* (2006.01)
*E05C 3/00* (2006.01)

(52) U.S. Cl.
CPC .............. *E05C 3/046* (2013.01); *E05C 3/004* (2013.01); *E05C 1/10* (2013.01)

(58) Field of Classification Search
CPC ...... E05C 3/046; E05C 2007/007; E05C 1/10; E05C 19/06; E05C 3/004; E05B 65/0841; E05B 65/0852; E05B 65/0876; E05B 53/003
See application file for complete search history.

(56) References Cited

U.S. PATENT DOCUMENTS

| | | |
|---|---|---|
| 16,228 A | 12/1856 | Copeland |
| 30,408 A | 10/1860 | Judd |
| 36,524 A | 9/1862 | Minor |

(Continued)

FOREIGN PATENT DOCUMENTS

| | | | |
|---|---|---|---|
| CA | 2992217 A1 * | 7/2018 | ........... E05B 15/006 |
| GB | 1363185 A * | 8/1974 | ......... E05B 17/0058 |

(Continued)

OTHER PUBLICATIONS

Press Fit Forces Stress Design Calculator, Jun. 18, 2018, available at: www.engineersedge.com/calculators/machine-design/press-fit/press-fit.htm.

(Continued)

*Primary Examiner* — Christine M Mills
*Assistant Examiner* — Faria F Ahmad
(74) *Attorney, Agent, or Firm* — Thomas A. O'Rourke; James Bongiorno; O'ROURKE IP LAW PLLC

(57) ABSTRACT

A sash lock housing enable screwless installation with respect to an opening in a sash window meeting rail, and includes a front, rear, and top walls. The top wall has a flat bottom surface. The rear wall includes first and second cantilevered ends, and a lip with a flat top surface being separated a small distance from the top wall's flat bottom surface that is configured to cause respective engagement with a top surface and a bottom surface of a top wall of the meeting rail, when the sash lock is inserted into the meeting rail opening. Also, the first and second cantilevered portions respectively engage first and second inside surfaces of a side wall of the meeting rail, to maintain the engagement between the top wall of the meeting rail and each of: the lip and the flat bottom surface of the top wall of the housing.

15 Claims, 23 Drawing Sheets

(56) References Cited

U.S. PATENT DOCUMENTS

| | | | |
|---|---|---|---|
| 51,222 | A | 11/1865 | Ridell |
| 108,778 | A | 11/1870 | Gorman |
| 115,781 | A | 6/1871 | Steele |
| 126,872 | A | 5/1872 | Buckman |
| 148,857 | A | 3/1874 | Smith |
| 163,008 | A | 5/1875 | Gillespie |
| 166,842 | A | 8/1875 | Berryman |
| 178,360 | A | 6/1876 | Cooper |
| 190,074 | A | 4/1877 | Penfield |
| 192,614 | A | 7/1877 | Andrews |
| 192,919 | A | 7/1877 | Hoyt |
| 201,146 | A | 3/1878 | Adler |
| 226,033 | A | 3/1880 | Burns |
| 230,476 | A | 7/1880 | Green |
| 234,387 | A | 11/1880 | Burgess |
| 284,993 | A | 9/1883 | Abele |
| 314,350 | A | 3/1885 | Smith |
| 316,285 | A | 4/1885 | McKeen |
| 331,005 | A | 11/1885 | Sahr |
| 336,302 | A | 2/1886 | Dudgeon |
| 346,788 | A | 8/1886 | Teufel |
| 350,678 | A | 10/1886 | Hussey |
| 353,287 | A | 11/1886 | Chumard |
| 368,595 | A | 8/1887 | King |
| 369,885 | A | 9/1887 | Shaw |
| 375,656 | A | 12/1887 | Shaw |
| 376,252 | A | 1/1888 | McIntyre |
| 379,910 | A | 3/1888 | Rosentreter |
| 410,728 | A | 9/1889 | Brown |
| 417,868 | A | 12/1889 | Janes |
| 423,761 | A | 3/1890 | Hasenpflug |
| 426,303 | A | 4/1890 | McGovern |
| 447,068 | A | 2/1891 | Dixan |
| 452,723 | A | 5/1891 | Schmalhausen |
| 471,363 | A | 3/1892 | Sloan |
| 480,148 | A | 8/1892 | Theby |
| 493,159 | A | 3/1893 | Gibson |
| 509,941 | A | 12/1893 | Perry |
| 512,593 | A | 1/1894 | Webster |
| 520,754 | A | 5/1894 | Burmeister |
| 526,118 | A | 9/1894 | Sharp |
| 528,656 | A | 11/1894 | Burmeister |
| 530,078 | A | 12/1894 | Ammerman |
| 532,935 | A | 1/1895 | Woolery |
| 534,185 | A | 2/1895 | Winchester |
| 537,258 | A | 4/1895 | Wilcox |
| 539,030 | A | 5/1895 | Bitner |
| 551,181 | A | 12/1895 | Dillon |
| 551,242 | A | 12/1895 | Wallace |
| 554,448 | A | 2/1896 | Keil |
| 564,426 | A | 7/1896 | Hubbard |
| 572,591 | A | 12/1896 | Woodard |
| 587,424 | A | 8/1897 | Bonine |
| 590,225 | A | 9/1897 | Hill |
| 653,458 | A | 7/1900 | Paquette |
| 666,596 | A | 1/1901 | Breen |
| 683,928 | A | 10/1901 | Geraghty |
| 688,491 | A | 12/1901 | Sigler |
| 695,736 | A | 3/1902 | Kendrick |
| 698,742 | A | 4/1902 | Scharnweber |
| 699,696 | A | 5/1902 | Mellen |
| 708,406 | A | 9/1902 | Robison |
| 714,343 | A | 11/1902 | Wellman |
| 718,007 | A | 1/1903 | Linn |
| 719,981 | A | 2/1903 | Adams |
| 722,162 | A | 3/1903 | Louis |
| 724,466 | A | 4/1903 | Hannan |
| 743,716 | A | 11/1903 | Hadka |
| 744,755 | A | 11/1903 | Hasenpflug |
| 745,888 | A | 12/1903 | McElwee |
| 749,469 | A | 1/1904 | Assorati |
| 756,453 | A | 4/1904 | Arens |
| 756,559 | A | 4/1904 | Arens |
| 757,249 | A | 4/1904 | Barnard |
| 759,642 | A | 5/1904 | Sparks |

| | | | |
|---|---|---|---|
| 764,493 | A | 7/1904 | Noseworthy |
| 769,386 | A | 9/1904 | Johnson |
| 769,767 | A | 9/1904 | Phelps |
| 774,536 | A | 11/1904 | Saunders |
| 775,602 | A | 11/1904 | Hearnshaw |
| 800,043 | A | 9/1905 | Witte |
| 804,994 | A | 11/1905 | Andrews |
| 815,537 | A | 3/1906 | Kissinger |
| 833,900 | A | 10/1906 | Sigler |
| 837,811 | A | 12/1906 | Ebbeson |
| 840,427 | A | 1/1907 | Brister |
| 865,090 | A | 9/1907 | Eddy |
| 866,073 | A | 9/1907 | Saunders |
| 878,206 | A | 2/1908 | Johnson |
| 881,658 | A | 3/1908 | Bowman |
| 886,108 | A | 4/1908 | Allen |
| 887,690 | A | 5/1908 | Pearce |
| 922,894 | A | 5/1908 | Heid |
| 897,719 | A | 9/1908 | Daubaignan |
| 900,079 | A | 10/1908 | Bittorf |
| 910,850 | A | 1/1909 | Petrie |
| 913,730 | A | 3/1909 | Kapus |
| 926,899 | A | 7/1909 | Roy |
| 928,408 | A | 7/1909 | Taube |
| 948,628 | A | 2/1910 | Jefferis |
| 959,150 | A | 5/1910 | Morris |
| 963,983 | A | 7/1910 | Bernhard |
| 966,063 | A | 8/1910 | Toothaker |
| 976,777 | A | 11/1910 | Brown |
| 980,131 | A | 12/1910 | Shean |
| 998,642 | A | 7/1911 | Shean |
| 1,003,386 | A | 9/1911 | Welker |
| 1,006,211 | A | 10/1911 | Hermon |
| 1,020,454 | A | 3/1912 | Seidenbecker |
| 1,041,803 | A | 10/1912 | Kilburn |
| 1,051,918 | A | 2/1913 | Rowley |
| 1,059,999 | A | 4/1913 | James |
| 1,069,079 | A | 7/1913 | Voight |
| 1,077,487 | A | 11/1913 | Miller |
| 1,080,172 | A | 12/1913 | Rusk |
| 1,100,820 | A | 6/1914 | Edwards |
| 1,121,228 | A | 12/1914 | Burkhart |
| 1,122,026 | A | 12/1914 | O'Rourke |
| 1,127,835 | A | 2/1915 | Westlund |
| 1,133,217 | A | 3/1915 | Barton |
| 1,141,437 | A | 6/1915 | Unterlender |
| 1,148,712 | A | 8/1915 | Overland |
| 1,163,086 | A | 12/1915 | Harper |
| 1,173,129 | A | 2/1916 | Taliaferro |
| 1,177,637 | A | 4/1916 | Lane |
| 1,177,838 | A | 4/1916 | Wilkinson |
| 1,207,989 | A | 12/1916 | O'Rourke |
| 1,232,683 | A | 7/1917 | Holllis |
| 1,243,115 | A | 10/1917 | Shur |
| 1,244,725 | A | 10/1917 | Gadke |
| 1,253,810 | A | 1/1918 | Gianninoto |
| 1,261,274 | A | 4/1918 | Newsam |
| 1,269,467 | A | 6/1918 | Winters |
| 1,270,740 | A | 6/1918 | Keyes |
| 1,272,900 | A | 7/1918 | Berman |
| 1,279,353 | A | 9/1918 | Kelley |
| 1,311,052 | A | 7/1919 | Danforth |
| 1,322,677 | A | 11/1919 | Ditlefsen |
| 1,338,250 | A | 4/1920 | Parkes |
| 1,338,416 | A | 4/1920 | Bellinger |
| 1,339,362 | A | 5/1920 | L'Heureux |
| 1,341,234 | A | 5/1920 | Horton |
| 1,350,698 | A | 8/1920 | Boedtcher |
| 1,387,302 | A | 8/1921 | Page |
| 1,388,272 | A | 8/1921 | Lawrence |
| 1,393,628 | A | 10/1921 | Leichter |
| 1,398,174 | A | 11/1921 | Carlson |
| 1,399,897 | A | 12/1921 | Singer |
| 1,412,154 | A | 4/1922 | Wollesen |
| 1,439,585 | A | 12/1922 | Trost |
| 1,461,467 | A | 7/1923 | Stuart |
| 1,463,866 | A | 8/1923 | Bourbeau |
| 1,470,858 | A | 10/1923 | Maxwell |
| 1,485,382 | A | 3/1924 | Foley |

(56) References Cited

U.S. PATENT DOCUMENTS

| | | | |
|---|---|---|---|
| 1,490,874 | A | 4/1924 | Webb |
| 1,516,995 | A | 11/1924 | Trigueiro |
| 1,550,532 | A | 8/1925 | French |
| 1,552,690 | A | 9/1925 | Frantz |
| 1,587,037 | A | 6/1926 | Rudolph |
| 1,601,051 | A | 9/1926 | Wilbert |
| 1,605,717 | A | 11/1926 | Gregg |
| 1,619,031 | A | 3/1927 | Ostrosky |
| 1,622,742 | A | 3/1927 | Shipman |
| 1,656,818 | A | 1/1928 | Dillon |
| 1,692,579 | A | 11/1928 | Schrader |
| 1,704,946 | A | 3/1929 | Lindgren |
| 1,712,792 | A | 5/1929 | Hansen |
| 1,715,957 | A | 6/1929 | Stein |
| 1,724,637 | A | 8/1929 | Bergstrom |
| 1,750,715 | A | 3/1930 | Jeffers |
| 1,794,171 | A | 2/1931 | Grutel |
| 1,812,288 | A | 6/1931 | Drapeau |
| 1,819,824 | A | 8/1931 | McAllister |
| 1,864,253 | A | 6/1932 | McIntyre |
| 1,869,274 | A | 7/1932 | Phillips |
| 1,877,177 | A | 9/1932 | Hinderer |
| 1,891,940 | A | 12/1932 | McAllister |
| 1,900,936 | A | 3/1933 | Huttger |
| 1,901,974 | A | 3/1933 | Macy |
| 1,918,114 | A | 7/1933 | Lorenzen |
| 1,922,062 | A | 8/1933 | Sullivan |
| 1,940,084 | A | 12/1933 | Grasso |
| 1,960,034 | A | 5/1934 | Stewart |
| 1,964,114 | A | 6/1934 | Gerlach |
| 2,095,057 | A | 10/1937 | Corrado |
| 2,122,661 | A | 7/1938 | Rightmyer |
| 2,126,995 | A | 8/1938 | Kingdon |
| 2,136,408 | A | 11/1938 | Bedell |
| 2,158,260 | A | 5/1939 | Stillman |
| 2,202,561 | A | 5/1940 | Lahiere |
| 2,232,965 | A | 2/1941 | Peri |
| 2,272,145 | A | 2/1942 | Anderson |
| 2,326,084 | A | 8/1943 | Westrope |
| 2,369,584 | A | 2/1945 | Lundholm |
| 2,452,521 | A | 10/1948 | Johnson |
| 2,480,016 | A | 8/1949 | Granberg |
| 2,480,988 | A | 9/1949 | Walton |
| 2,500,349 | A | 3/1950 | Menns |
| 2,503,370 | A | 4/1950 | Zanona |
| 2,523,559 | A | 9/1950 | Couture |
| 2,527,278 | A | 10/1950 | Schemansky |
| 2,537,736 | A | 1/1951 | Carlson |
| 2,560,274 | A | 7/1951 | Cantelo |
| 2,581,816 | A | 1/1952 | Schlueter |
| 2,590,624 | A | 3/1952 | James |
| 2,599,196 | A | 6/1952 | Peremi |
| 2,605,125 | A | 7/1952 | Emerson |
| 2,612,398 | A | 9/1952 | Miller |
| 2,613,526 | A | 10/1952 | Holmsten |
| 2,621,951 | A | 12/1952 | Ostadal |
| 2,645,515 | A | 7/1953 | Thomas |
| 2,648,967 | A | 8/1953 | Holmsten |
| 2,670,982 | A | 3/1954 | Banham |
| 2,692,789 | A | 10/1954 | Rivard |
| 2,735,707 | A | 2/1956 | Sylvan |
| 2,758,862 | A | 8/1956 | Endter |
| 2,766,492 | A | 10/1956 | Day |
| 2,789,851 | A | 4/1957 | Lickteig |
| 2,818,919 | A | 1/1958 | Sylvan |
| 2,846,258 | A | 8/1958 | Granberg |
| 2,855,772 | A | 10/1958 | Hillgren |
| 2,884,276 | A | 4/1959 | Baptist |
| 2,920,914 | A | 1/1960 | Jenkins |
| 2,941,832 | A | 6/1960 | Grossman |
| 2,967,595 | A | 1/1961 | Zitomer |
| 2,997,323 | A | 8/1961 | Riser |
| 3,027,188 | A | 3/1962 | Eichstadt |
| 3,122,387 | A | 2/1964 | Wakelin |
| 3,135,542 | A | 6/1964 | Wilkenson |
| 3,187,526 | A | 6/1965 | Moler |
| 3,267,613 | A | 8/1966 | McQuiston |
| 3,288,510 | A | 11/1966 | Gough |
| 3,352,586 | A | 11/1967 | Hakanson |
| 3,362,740 | A | 1/1968 | Burns |
| 3,422,575 | A | 1/1969 | Armstrong |
| 3,425,729 | A | 2/1969 | Bisbing |
| 3,438,153 | A | 4/1969 | Lemme |
| 3,469,877 | A | 9/1969 | Hutchison |
| 3,599,452 | A | 8/1971 | Maruyama |
| 3,600,019 | A | 8/1971 | Toyota |
| 3,642,315 | A | 2/1972 | Alpern |
| 3,645,573 | A | 2/1972 | Strang |
| 3,683,652 | A | 8/1972 | Halopoff |
| 3,706,467 | A | 12/1972 | Martin |
| 3,762,750 | A | 10/1973 | Orr |
| 3,811,718 | A | 5/1974 | Bates |
| 3,907,348 | A | 9/1975 | Bates |
| 3,919,808 | A | 11/1975 | Simmons |
| 3,927,906 | A | 12/1975 | Mieras |
| 3,930,678 | A | 1/1976 | Alexander |
| 4,054,308 | A | 10/1977 | Prohaska |
| 4,059,298 | A | 11/1977 | Van Klompenburg |
| 4,063,766 | A | 12/1977 | Granberg |
| 4,068,871 | A | 1/1978 | Mercer |
| 4,095,827 | A | 6/1978 | Stavenau |
| 4,095,829 | A | 6/1978 | Van Klompenburg |
| 4,102,546 | A | 7/1978 | Costello |
| 4,151,682 | A | 5/1979 | Schmidt |
| 4,165,894 | A | 8/1979 | Wojciechowski |
| 4,223,930 | A | 9/1980 | Costello |
| 4,227,345 | A | 10/1980 | Durham |
| 4,235,465 | A | 11/1980 | Costello |
| 4,253,688 | A | 3/1981 | Hosooka |
| 4,261,602 | A | 4/1981 | Anderson |
| 4,274,666 | A | 6/1981 | Peck |
| 4,293,154 | A | 10/1981 | Cassells |
| 4,303,264 | A | 12/1981 | Uehara |
| 4,305,612 | A | 12/1981 | Hunt |
| 4,392,329 | A | 7/1983 | Suzuki |
| 4,429,910 | A | 2/1984 | Anderson |
| 4,470,277 | A | 9/1984 | Uyeda |
| 4,475,311 | A | 10/1984 | Gibson |
| 4,525,952 | A | 7/1985 | Cunningham |
| 4,580,366 | A | 4/1986 | Hardy |
| 4,587,759 | A | 5/1986 | Gray |
| 4,621,847 | A | 11/1986 | Paulson |
| 4,624,073 | A | 11/1986 | Randall |
| 4,639,021 | A | 1/1987 | Hope |
| 4,643,005 | A | 2/1987 | Logas |
| 4,655,489 | A | 4/1987 | Bisbing |
| 4,736,972 | A | 4/1988 | Mosch |
| 4,801,164 | A | 1/1989 | Mosch |
| 4,813,725 | A | 3/1989 | Mosch |
| 4,824,154 | A | 4/1989 | Simpson |
| 4,826,222 | A | 5/1989 | Davis |
| 4,827,685 | A | 5/1989 | Schmidt |
| 4,893,849 | A | 1/1990 | Schlack |
| 4,922,658 | A | 5/1990 | Coddens |
| 4,923,230 | A | 5/1990 | Simpson |
| 4,949,506 | A | 8/1990 | Durham |
| 4,961,286 | A | 10/1990 | Bezubic |
| 4,991,886 | A | 2/1991 | Nolte |
| 5,042,855 | A | 8/1991 | Bennett |
| 5,072,464 | A | 12/1991 | Draheim |
| 5,076,015 | A | 12/1991 | Manzalini |
| 5,087,087 | A | 2/1992 | Vetter |
| 5,087,088 | A | 2/1992 | Milam |
| 5,090,750 | A | 2/1992 | Lindqvist |
| 5,090,754 | A | 2/1992 | Thompson |
| 5,092,640 | A | 3/1992 | Plummer |
| 5,110,165 | A | 5/1992 | Piltingsrud |
| 5,127,685 | A | 7/1992 | Dallaire |
| 5,139,291 | A | 8/1992 | Schultz |
| 5,143,412 | A | 9/1992 | Lindqvist |
| 5,161,839 | A | 11/1992 | Piltingsrud |
| 5,165,737 | A | 11/1992 | Riegelman |
| 5,183,310 | A | 2/1993 | Shaughnessy |
| 5,217,264 | A | 6/1993 | Fier |

(56) References Cited

U.S. PATENT DOCUMENTS

| | | | | |
|---|---|---|---|---|
| 5,219,193 | A | 6/1993 | Piltingsrud | |
| 5,244,238 | A | 9/1993 | Lindqvist | |
| 5,248,174 | A | 9/1993 | Matz | |
| 5,274,955 | A | 1/1994 | Dallaire | |
| 5,341,752 | A | 8/1994 | Hambleton | |
| 5,398,447 | A | 3/1995 | Morse | |
| 5,437,484 | A | 8/1995 | Yamada | |
| 5,448,857 | A | 9/1995 | Stormo | |
| 5,452,925 | A | 9/1995 | Huang | |
| 5,454,609 | A | 10/1995 | Slocomb | |
| 5,536,052 | A * | 7/1996 | Maier | E05B 65/0852 292/DIG. 47 |
| 5,553,903 | A | 9/1996 | Prete | |
| 5,560,149 | A | 10/1996 | Lafevre | |
| 5,575,116 | A | 11/1996 | Carlson | |
| 5,582,445 | A | 12/1996 | Olsen | |
| RE35,463 | E | 2/1997 | Vetter | |
| 5,618,067 | A * | 4/1997 | Carlson | E05B 9/08 292/337 |
| 5,636,475 | A | 6/1997 | Nidelkoff | |
| 5,671,958 | A * | 9/1997 | Szapucki | E05C 1/10 292/DIG. 47 |
| 5,688,000 | A | 11/1997 | Dolman | |
| 5,715,631 | A | 2/1998 | Kailian | |
| 5,741,032 | A | 4/1998 | Chaput | |
| 5,778,602 | A | 7/1998 | Johnson | |
| 5,791,700 | A | 8/1998 | Biro | |
| 5,806,900 | A | 9/1998 | Bratcher | |
| 5,829,196 | A | 11/1998 | Maier | |
| 5,839,767 | A | 11/1998 | Piltingsrud | |
| 5,878,608 | A * | 3/1999 | Alyanakian | E05C 1/10 292/DIG. 31 |
| 5,901,499 | A | 5/1999 | Delaske | |
| 5,901,501 | A | 5/1999 | Fountaine | |
| 5,911,763 | A | 6/1999 | Quesada | |
| 5,927,768 | A | 7/1999 | Dallmann | |
| 5,934,716 | A * | 8/1999 | Koveal | E05C 1/10 292/DIG. 61 |
| 5,970,656 | A | 10/1999 | Maier | |
| 5,992,907 | A | 11/1999 | Sheldon | |
| 6,000,735 | A | 12/1999 | Jourdenais | |
| 6,082,786 | A * | 7/2000 | Stephens | E05C 19/06 292/228 |
| 6,086,121 | A | 7/2000 | Buckland | |
| 6,116,665 | A | 9/2000 | Subliskey | |
| 6,135,510 | A | 10/2000 | Diginosa | |
| 6,139,071 | A | 10/2000 | Hopper | |
| 6,142,541 | A | 11/2000 | Rotondi | |
| 6,155,615 | A | 12/2000 | Schulz | |
| 6,176,041 | B1 | 1/2001 | Roberts | |
| 6,178,696 | B1 | 1/2001 | Liang | |
| 6,183,024 | B1 | 2/2001 | Schultz | |
| 6,209,931 | B1 | 4/2001 | Von Stoutenborough | |
| 6,217,087 | B1 | 4/2001 | Fuller | |
| 6,230,443 | B1 | 5/2001 | Schultz | |
| 6,250,694 | B1 | 6/2001 | Weiland | |
| 6,279,266 | B1 | 8/2001 | Searcy | |
| 6,349,576 | B2 | 2/2002 | Subliskey | |
| 6,364,375 | B1 | 4/2002 | Szapucki | |
| 6,450,544 | B2 | 9/2002 | Rotondi | |
| 6,546,671 | B2 | 4/2003 | Mitchell | |
| 6,565,133 | B1 | 5/2003 | Timothy | |
| 6,568,723 | B2 | 5/2003 | Murphy | |
| 6,588,150 | B1 | 7/2003 | Wong | |
| 6,592,155 | B1 | 7/2003 | Lemley | |
| 6,607,221 | B1 | 8/2003 | Elliot | |
| 6,631,931 | B2 | 10/2003 | Magnusson | |
| 6,634,683 | B1 | 10/2003 | Brannan | |
| 6,688,659 | B2 | 2/2004 | Kobrehel | |
| 6,817,142 | B2 * | 11/2004 | Marshik | E05B 65/0835 292/DIG. 20 |
| 6,848,728 | B2 | 2/2005 | Rotondi | |
| 6,871,885 | B2 | 3/2005 | Goldenberg | |
| 6,871,886 | B2 | 3/2005 | Coleman | |
| 6,877,784 | B2 | 4/2005 | Kelley | |
| 6,925,758 | B2 | 8/2005 | Petit | |
| 6,957,513 | B2 | 10/2005 | Pettit | |
| 6,983,963 | B2 | 1/2006 | Eslick | |
| 7,000,957 | B2 | 2/2006 | Lawrence | |
| 7,013,603 | B2 | 3/2006 | Eenigenburg | |
| 7,017,957 | B2 | 5/2006 | Murphy | |
| 7,036,851 | B2 | 5/2006 | Romig | |
| 7,063,361 | B1 | 6/2006 | Lawrence | |
| 7,070,211 | B2 | 7/2006 | Polowinczak et al. | |
| 7,070,215 | B2 | 7/2006 | Kelley | |
| 7,100,951 | B2 | 9/2006 | Jien | |
| 7,147,255 | B2 | 12/2006 | Goldenberg | |
| 7,159,908 | B2 | 1/2007 | Liang | |
| 7,171,784 | B2 | 2/2007 | Eenigenburg | |
| 7,296,831 | B2 | 11/2007 | Generowicz | |
| 7,322,619 | B2 | 1/2008 | Nolte | |
| 7,322,620 | B1 | 1/2008 | Lawrence | |
| 7,407,199 | B2 | 8/2008 | Richardson | |
| 7,431,356 | B2 | 10/2008 | Liang | |
| 7,441,811 | B2 | 10/2008 | Lawrence | |
| 7,481,470 | B2 | 1/2009 | Eenigenburg | |
| 7,490,873 | B1 * | 2/2009 | Ricke | E05B 65/0876 292/DIG. 47 |
| 7,510,221 | B2 | 3/2009 | Eenigenburg | |
| 7,530,611 | B2 | 5/2009 | Liang | |
| 7,559,588 | B2 | 7/2009 | Liang | |
| 7,607,262 | B2 | 10/2009 | Pettit | |
| 7,637,544 | B2 | 12/2009 | Liang | |
| 7,665,775 | B1 | 2/2010 | Miller | |
| 7,699,365 | B2 | 4/2010 | Liang | |
| 7,922,223 | B2 | 4/2011 | Lawrence | |
| 7,976,077 | B2 | 7/2011 | Flory et al. | |
| 8,205,919 | B2 | 6/2012 | Flory | |
| 8,205,920 | B2 | 6/2012 | Flory | |
| 8,220,846 | B2 | 7/2012 | Liang | |
| 8,231,148 | B2 | 7/2012 | Van Der Kooij | |
| 8,235,430 | B2 * | 8/2012 | Liang | E05B 9/08 292/228 |
| 8,272,164 | B2 | 9/2012 | Albrecht | |
| 8,336,930 | B2 | 12/2012 | Liang | |
| 8,360,484 | B2 | 1/2013 | Liang | |
| 8,414,039 | B2 | 4/2013 | Liang | |
| 8,511,724 | B2 | 8/2013 | Liang | |
| 8,550,507 | B2 | 10/2013 | Barton | |
| 8,567,830 | B2 | 10/2013 | Liang | |
| 8,657,347 | B2 | 2/2014 | Liang | |
| 8,726,572 | B2 | 5/2014 | Derham | |
| 8,789,857 | B2 | 7/2014 | Liang | |
| 8,789,862 | B2 | 7/2014 | Liang | |
| 8,833,809 | B2 | 9/2014 | Liang | |
| 8,844,985 | B2 | 9/2014 | Liang | |
| 8,870,244 | B2 | 10/2014 | Liang | |
| 8,881,461 | B2 | 11/2014 | Derham | |
| 9,103,144 | B2 | 8/2015 | Liang | |
| 9,140,033 | B2 | 9/2015 | Wolf | |
| 9,376,834 | B2 | 6/2016 | Liang | |
| 9,493,970 | B2 | 11/2016 | Campbell | |
| 9,617,765 | B1 * | 4/2017 | Lawrence | E05B 65/0864 |
| 9,816,300 | B2 | 11/2017 | Derham | |
| 10,107,021 | B1 | 10/2018 | Liang | |
| 10,704,297 | B2 * | 7/2020 | Liang | E05C 1/12 |
| 11,339,585 | B1 * | 5/2022 | Wilson | E05C 1/10 |
| 11,365,561 | B2 * | 6/2022 | Hollermann | E05C 1/12 |
| 2002/0185871 | A1 * | 12/2002 | Straka, Jr. | E05C 1/10 292/163 |
| 2004/0207212 | A1 * | 10/2004 | Wallis | E05C 1/12 292/241 |
| 2006/0192391 | A1 | 8/2006 | Pettit | |
| 2006/0244270 | A1 | 11/2006 | Rotondi | |
| 2007/0205615 | A1 | 9/2007 | Eenigenburg | |
| 2007/0284893 | A1 * | 12/2007 | Davies | E05C 9/045 292/336.3 |
| 2008/0012358 | A1 | 1/2008 | Liang | |
| 2008/0022728 | A1 | 1/2008 | Flory | |
| 2008/0169658 | A1 | 7/2008 | Wolf | |
| 2010/0199726 | A1 | 8/2010 | Varney | |
| 2010/0218425 | A1 | 9/2010 | Nolte | |
| 2010/0263415 | A1 | 10/2010 | Ruspil | |

(56) References Cited

U.S. PATENT DOCUMENTS

| | | | | |
|---|---|---|---|---|
| 2013/0125471 | A1* | 5/2013 | Benevenga | E05B 65/0841 49/506 |
| 2013/0214545 | A1 | 8/2013 | Wolf | |
| 2013/0283695 | A1 | 10/2013 | Hollerman | |
| 2013/0285391 | A1* | 10/2013 | Wolf | E05C 3/046 292/241 |
| 2015/0252596 | A1* | 9/2015 | Liang | E05C 1/12 292/163 |
| 2015/0252600 | A1* | 9/2015 | Liang | E05B 65/0841 292/169 |
| 2016/0076282 | A1 | 3/2016 | Wolf | |
| 2018/0128018 | A1* | 5/2018 | Rampen | E05B 63/128 |
| 2019/0211582 | A1* | 7/2019 | Nau | E06B 1/702 |
| 2019/0330891 | A1* | 10/2019 | Paré | E05C 19/06 |

FOREIGN PATENT DOCUMENTS

| | | | | |
|---|---|---|---|---|
| GB | 2 286 627 | | 8/1995 | |
| GB | 2 461 079 | | 12/2009 | |
| GB | 2 461 107 | | 12/2009 | |
| GB | 2 461 108 | | 12/2009 | |
| JP | 2003041812 | A | 2/2003 | |
| WO | WO-9938734 | A1 * | 8/1999 | E05B 13/002 |
| WO | WO-9954579 | A1 * | 10/1999 | E05C 1/10 |

OTHER PUBLICATIONS

"Three General Types of Fit," available at www.mmto.org/dclark/Reports/Encoder%20Upgrade/fittolerences%20%5BRead-Only%5D.pdf., Jul. 8, 2019.

"Engineering Fit," available at: https://en.wikipedia.org/wiki/Engineering_fit, Jul. 8, 2019.

* cited by examiner 110
111
112
113
114
115
116

120
120P
121
122
123
124i
124ii
124Hi
124Hii

125TS

115BS 110
115
115BS
121
122
124i
124ii
124Ei
124Eii
125
125L
126
127
128
129
131
132
Ø

127T
127Sii
127Si
127C

WINDOW SASH LOCK CONFIGURED FOR SCREWLESS SNAP-IN INSTALLATION ONTO A MEETING RAIL

CROSS-REFERENCES

This application claims priority on U.S. Provisional Application Ser. No. 63/352,651, filed on Jun. 16, 2022.

FIELD OF THE INVENTION

The present invention relates to sash locks for slidable sash windows, and more particularly to an improved sash lock that is configured to snap into the meeting rail of the window and be installed without the use of screws.

BACKGROUND OF THE INVENTION

Single hung and double hung sliding sash windows are known in the art, and are often utilized in the construction of homes and other dwellings, and even offices. Sash locks are typically used to secure the lower sash window in a closed position, if the upper sash is not moveable, or may be used to secure both the upper and lower sash windows in a closed position where both are slidable with respect to a master window frame. A sash lock is typically mounted to the meeting rail of the lower sash window, and includes a rotatable cam that is pivotally mounted to a housing, where the cam may engage a keeper in a locked (extended) position, which keeper may be attached to the upper sash window or to the master window frame.

The present invention provides improvements to such window hardware in the form of a sash lock for single hung or double hung windows, which sash lock is configured to snap into the meeting rail of the window, so that it may be installed without the use of screws.

OBJECTS OF THE INVENTION

It is an object of the invention to provide a sash lock to prevent relative sliding movement of one or both sliding sash windows that are slidable within a master window frame.

It is another object of the invention to provide a sash lock that is configured to be installed on a meeting rail of a sash window without the use of fasteners.

It is a further object of the invention to provide a sash lock that is configured to snap into the meeting rail of a sash window.

Further objects and advantages of the invention will become apparent from the following description and claims, and from the accompanying drawings.

SUMMARY OF THE INVENTION

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In accordance with at least one embodiment of the disclosed apparatus, a sash lock assembly that is configured for screwless installation of a portion thereof with respect to an opening in a meeting rail of a sash window may broadly include: a housing, a shaft/handle member, and a cam.

The housing is formed to include a top wall, a front wall, and a rear wall that together may create a housing cavity. At least a portion of the top wall includes a substantially flat bottom surface, and a hole for pivotal mounting of the shaft thereto, with the cam being mounted to the shaft to thereby be pivotable between a retracted position and an extended position. The front wall includes an opening through which a portion of the cam may protrude outwardly, when it is pivoted into the extended position. A first end of the rear wall includes a first cantilevered portion, and a second end of the rear wall includes a second cantilevered portion. The rear wall also includes a lip that has a substantially flat top surface that is parallel and adjacent to the substantially flat bottom surface of the top wall (i.e., being separated by a small distance). The lip and the substantially flat bottom surface of the top wall are spaced apart a distance configured to cause respective engagement with a top surface and a bottom surface of a top wall of the meeting rail, when the sash lock is inserted into the opening in the meeting rail. Also, the first and second cantilevered portions of the rear wall are configured to respectively engage an inside surface of first and second portions of a side wall of the meeting rail, to maintain the engagement between the top wall of the meeting rail and each of: the substantially flat top surface of the lip and the substantially flat bottom surface of the top wall of the housing. In addition, those first and second portions of the side wall of the meeting rail may be nested between the first and second cantilevered portions and engagement surfaces of optional first and second protruding portions of the front wall.

Each of first and second cantilevered portions have a distal end shaped like a barb, which includes: a cam surface and at least one contact surface. The cam surface is configured to cause deflection of each respective cantilevered portion when the sash lock is being engaged with the meeting rail, and the at least one contact region is configured for the engagement between each of the first and second cantilevered portions of the rear wall and the inside surface of the first and second portions of the side wall of the meeting rail.

The barb may include a tool removal surface configured to receive a screwdriver blade to deflect one of the cantilevered portions of said rear wall to permit disengagement and removal of the sash lock housing from the meeting rail.

BRIEF DESCRIPTION OF DRAWINGS

The description of the various example embodiments is explained in conjunction with the following appended drawings.

DETAILED DESCRIPTION OF THE INVENTION

Figure 1:
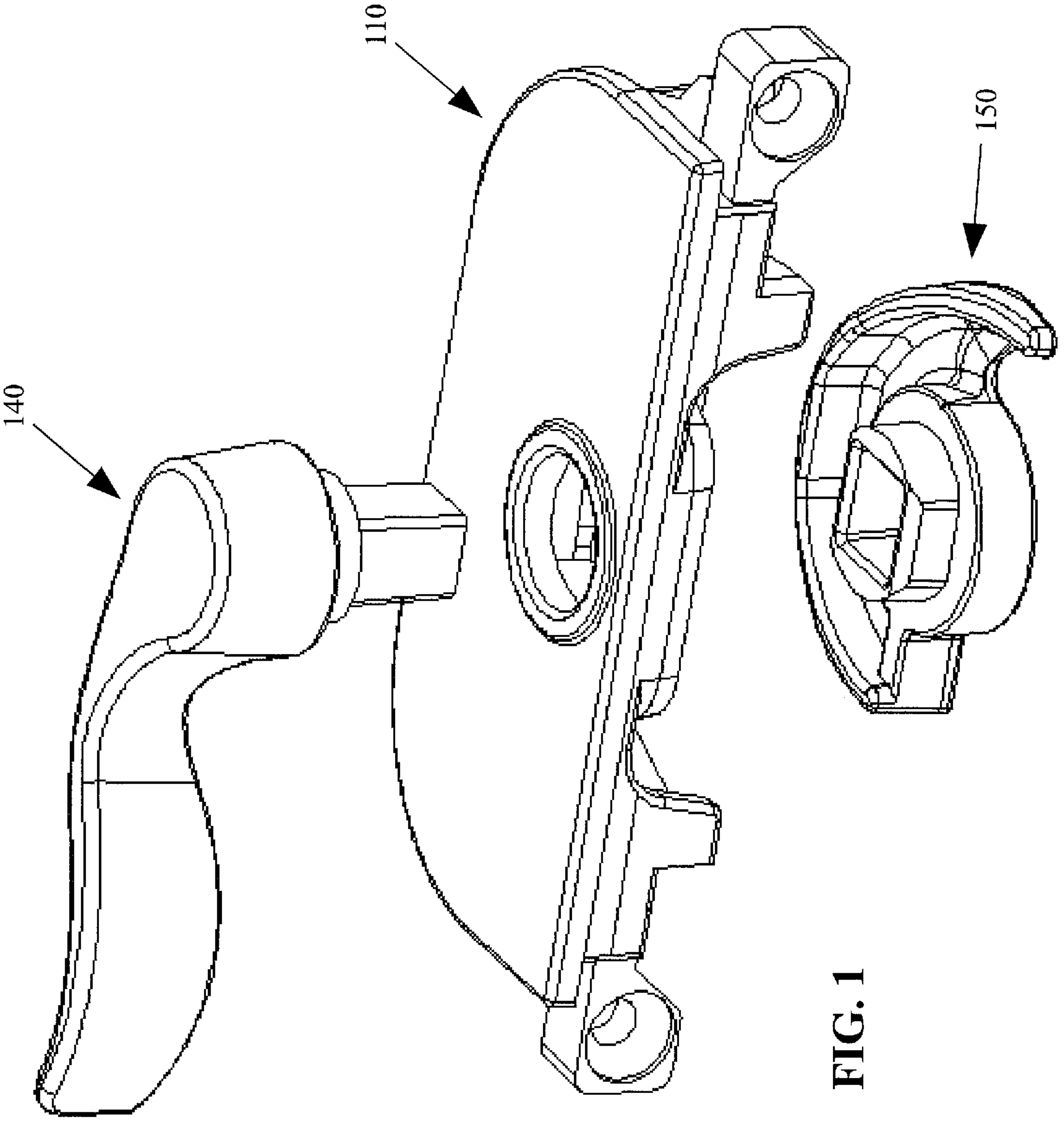
FIG. 1 is an exploded view of the component parts of a sash lock configured to snap into an opening of a meeting rail of a sash window, being installed without the use of screws.
Figure 2:
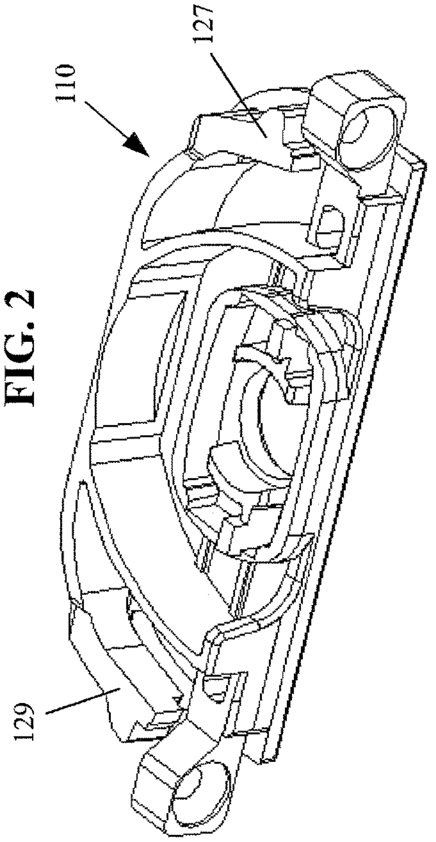
FIG. 2 is a bottom perspective view of the housing shown in FIG. 1.
Figure 3:
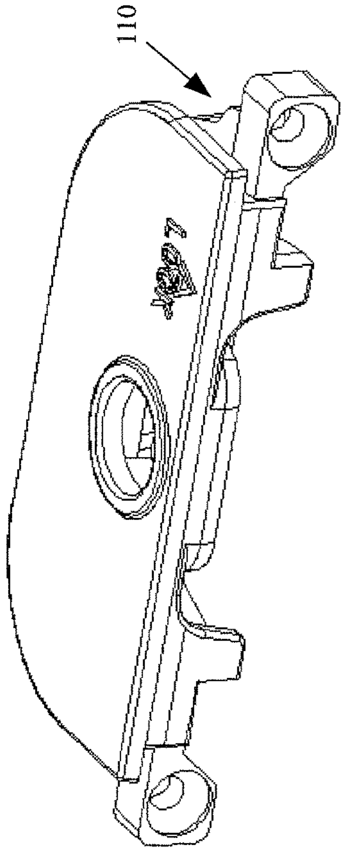
FIG. 3 is a top perspective view of the housing shown in FIG. 1.

As used throughout this specification, the word "may" is used in a permissive sense (i.e., meaning having the potential to, or being optional), rather than a mandatory sense (i.e., meaning must), as more than one embodiment of the invention may be disclosed herein. Similarly, the words "include", "including", and "includes" mean including but not limited to.

The phrases "at least one", "one or more", and "and/or" may be open-ended expressions that are both conjunctive and disjunctive in operation. For example, each of the expressions "at least one of A, B and C", "one or more of A, B, and C", and "A, B, and/or C" herein means all of the following possible combinations: A alone; or B alone; or C alone; or A and B together; or A and C together; or B and C together; or A, B and C together.

Also, the disclosures of all patents, published patent applications, and non-patent literature cited within this document are incorporated herein in their entirety by reference. However, It is noted that the citing of any reference within this disclosure, i.e., any patents, published patent applications, and non-patent literature, is not an admission regarding a determination as to its availability as prior art with respect to the herein disclosed and claimed apparatus/method.

Furthermore, any reference made throughout this specification to "one embodiment" or "an embodiment" means that a particular feature, structure or characteristic described in connection therewith is included in at least that one particular embodiment. Thus, the appearances of the phrases "in one embodiment" or "in an embodiment" in various places throughout this specification are not necessarily all referring to the same embodiment. Therefore, the described features, advantages, and characteristics of any particular aspect of an embodiment disclosed herein may be combined in any suitable manner with any of the other embodiments disclosed herein.

Additionally, any approximating language, as used herein throughout the specification and claims, may be applied to modify any quantitative or qualitative representation that could permissibly vary without resulting in a change in the basic function to which it is related. Accordingly, a value modified by a term such as "about" is not to be limited to the precise value specified, and may include values that differ from the specified value in accordance with design variations described in the specification, as well as applicable case law. Also, in at least some instances, a numerical difference provided by the approximating language may correspond to the precision of an instrument that may be used for measuring the value. A numerical difference provided by the approximating language may also correspond to a manufacturing tolerance associated with production of the aspect/feature being quantified (see e.g., Ex Parte Ollmar, Appeal No. 2014-006128 (PTAB 2016)). Furthermore, a numerical difference provided by the approximating language may also correspond to an overall tolerance for the aspect/feature that may be derived from variations resulting from a stack up (i.e., the sum) of a multiplicity of such individual tolerances.

Any use of a friction fit (i.e., an interface fit) between two mating parts described herein indicates that the opening (e.g., a hole) is smaller than the part received therein (e.g., a shaft), which may be a slight interference in one embodiment in the range of 0.0001 inches to 0.0003 inches, or an interference of 0.0003 inches to 0.0007 inches in another embodiment, or an interference of 0.0007 inches to 0.0010 inches in yet another embodiment, or a combination of such ranges. Other values for the interference may also be used in different configurations (see e.g., "Press Fit Engineering and Design Calculator," available at: www.engineersedge.com/calculators/machine-design/press-fit/press-fit-calculator.htm).

Any described use of a clearance fit indicates that the opening (e.g., a hole) is larger than the part received therein (e.g., a shaft), enabling the two parts to move (e.g. to slide and/or rotate) when assembled, where the gap between the opening and the part may depend upon the size of the part and the type of clearance fit—i.e., loose running, free running, easy running, close running, and sliding (e.g., for a 0.1250 inch shaft diameter the opening may be 0.1285 inches for a close running fit, and may be 0.1360 inches for a free running fit; for a 0.5000 inch diameter shaft the opening may be 0.5156 inches for a close running fit and may be 0.5312 inches for a free running fit). Other clearance amounts are used for other clearance types. See "Engineering Fit" at: https://en.wikipedia.org/wiki/Engineering_fit; and "Three General Types of Fit," available at www.mm-to.org/dclark/Reports/Encoder % 20Upgrade/fittolerences %20%5BRead-Only % 5D.pdf.

The terms "rigid," and "flexible," and "resilient" may be used herein to distinguish characteristics of portions of certain features of the sash lock. Use of the term "rigid" indicates that the described element is devoid of flexibility such that it does not readily lose its overall shape when force is applied by hand, and in fact it may break if an attempt to bend it is made with sufficient force. Use of the term "flexible" indicates that the described element is capable of repeated bending such that it may be bent into different shapes and does not retain a general shape, but instead readily deforms when force is applied. Use of the term "resilient" indicates that the described element has such flexible features and also has a tendency to return to its initial general shape without permanent deformation once a force that causes such flexure is removed. Use of the term "semi-rigid" indicates that the described element may have some degree of flexibility or resiliency.

Also, the drawings of the apparatus that are presented herein are not necessarily to scale (i.e., a part feature that measures one inch on the printed patent application document may not necessarily be one inch long); however the relative sizes of features shown in the figures are accurately depicted, apart from any distortion due to reproduction processes, as the patent drawings are derived from one or more three-dimensional computer graphics model(s) of the assembled apparatus and its component parts.

It is further noted that any use herein of relative terms such as "top," "bottom," "upper," "lower," "vertical," and "horizontal" are merely intended to be descriptive for the reader, and may be based on the depiction of those features within the figures for one particular position of the sash lock, and/or the ordinary orientation of a sash window in a dwelling; therefore such terms are not intended to limit the orientation with which the disclosed sash lock may be utilized.

A sash lock assembly 100 is configured for screwless installation of a portion thereof with respect to an opening in a meeting rail of a sash window.

In accordance with at least one embodiment, the sash lock 100, as seen in FIG. 1, may broadly include a housing 110, a shaft/handle member 140, and a cam 150.

The housing 110 is shown in detail in FIG. 2 through FIG. 9. The housing 110 generally includes: a top wall 115, a front wall 120, and a rear wall 125.

The top wall 115 may extend from a first end 111 to a second end 112, and from a first side 113 to a second side 114. A portion of the top wall 115 may be formed to include a substantially flat bottom surface 115BS (see FIG. 8) that may be positioned near the rear wall 125, and may extend between at least a portion of the first end 111 and the second end 112, and may extend at least a short distance away from the first side 113 towards the second side 114. The top wall 115 may also be formed with a hole 116 that may receive the shaft/handle member 140, as discussed hereinafter. Also, a central portion of the bottom surface of the top wall 115, as best seen in FIG. 7, may be formed to include a plurality of protruding features that may interact with the cam 150 and/or the shaft/handle member 140 (e.g., one or more protruding stop members to limit pivotal movement of the cam and/or the shaft/handle member in one or two directions of travel).

Figure 22A:
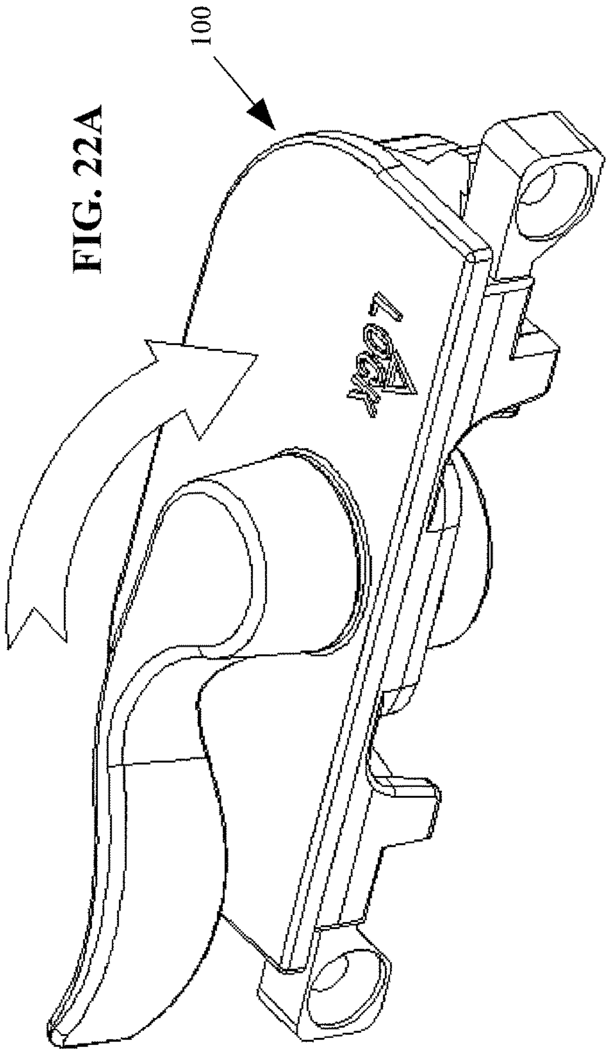
FIG. 22A is a first perspective view of the sash lock assembly formed from the component parts of FIG. 1, being shown with the shaft/handle member in a first position at which the cam is retracted into the housing and is unlocked when installed on the meeting rail of the sash window.
Figure 22B:
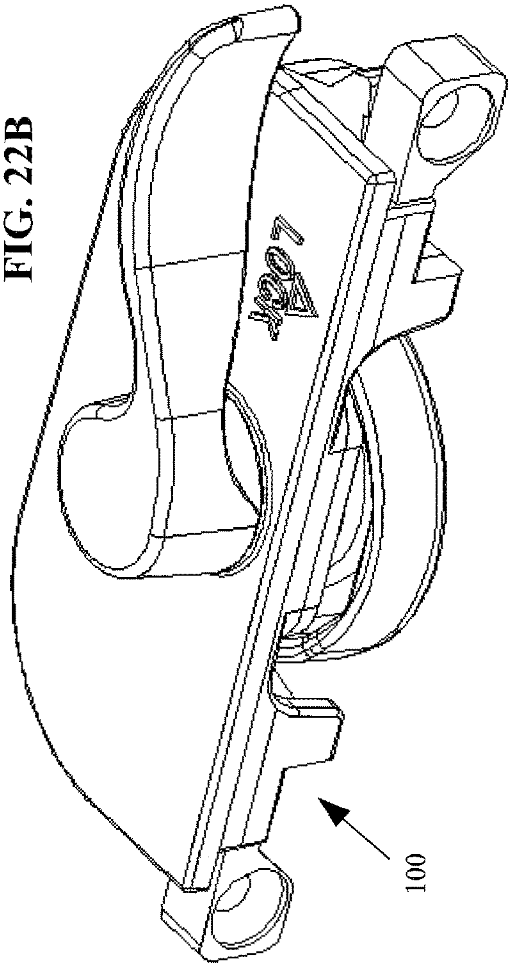
FIG. 22B is a second perspective view of the sash lock assembly of FIG. 22A, being shown with the shaft/handle member in a second position, at which the cam is extended out from the housing and would be locked with respect to a corresponding keeper, when the sash lock is installed on the meeting rail of the sash window.
Figure 23B:
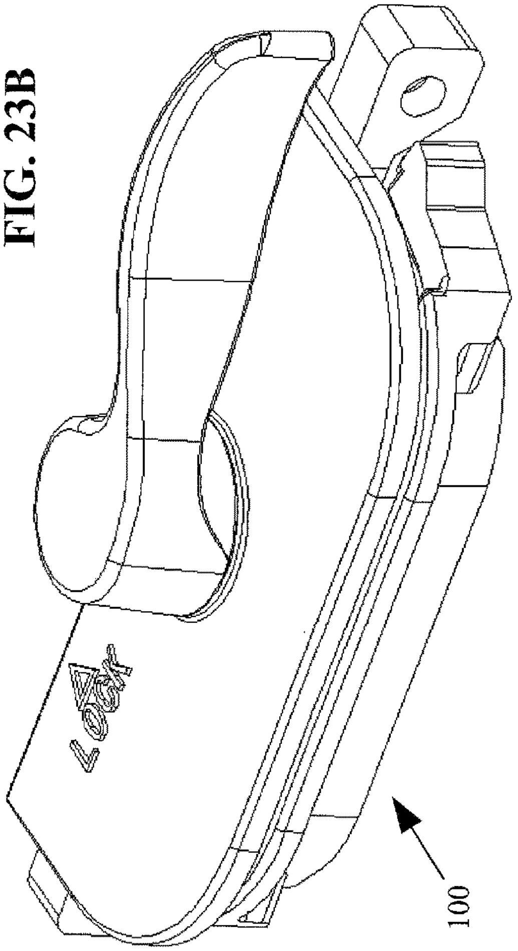
FIG. 23B is a fourth perspective view of the sash lock assembly of FIG. 22A.
Figure 23A:
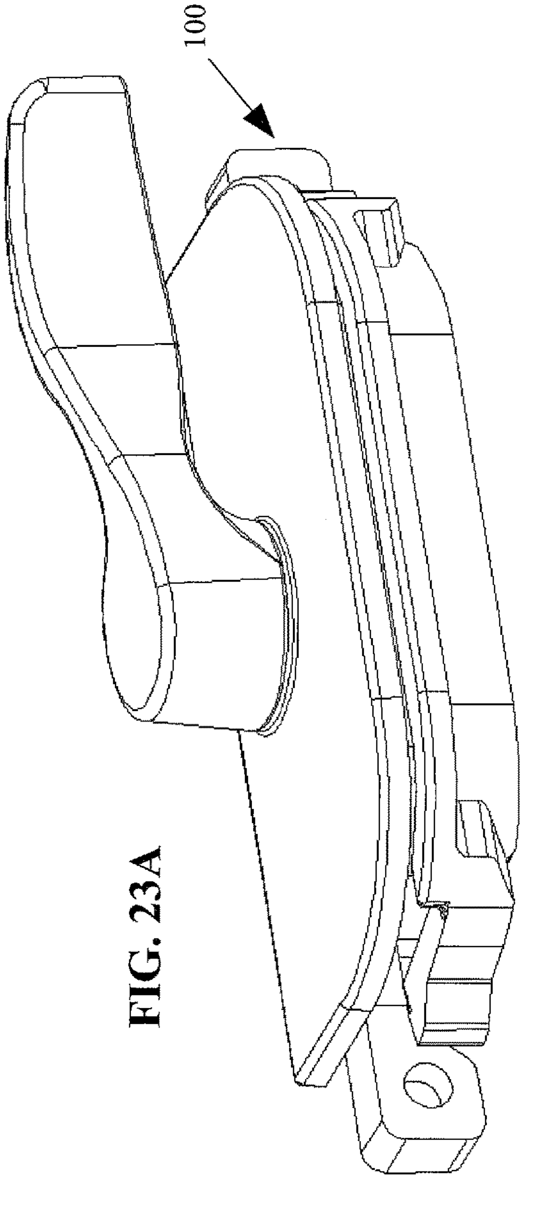
FIG. 23A is a third perspective view of the sash lock assembly of FIG. 22A.
Figure 24A:
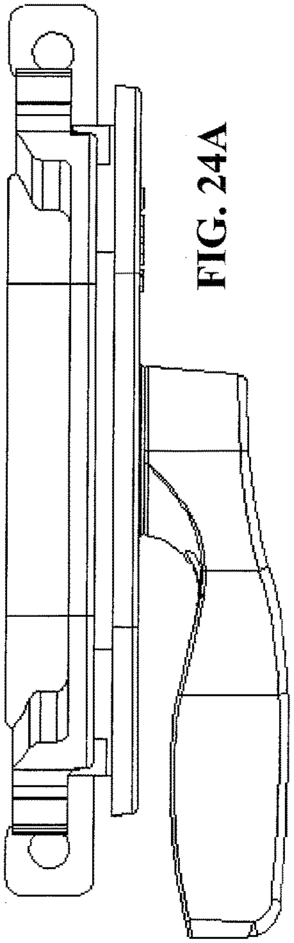
FIG. 24A is a rear view of the sash lock assembly of FIG. 22A.
Figure 25:
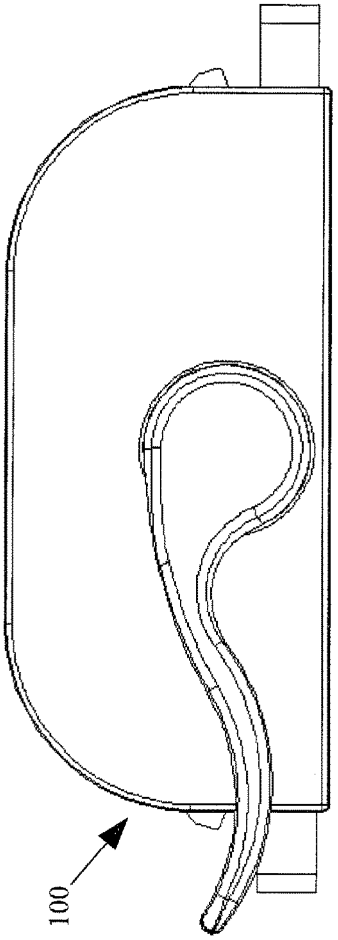
FIG. 25 is a top view of the sash lock assembly of FIG. 22A.
Figure 24:
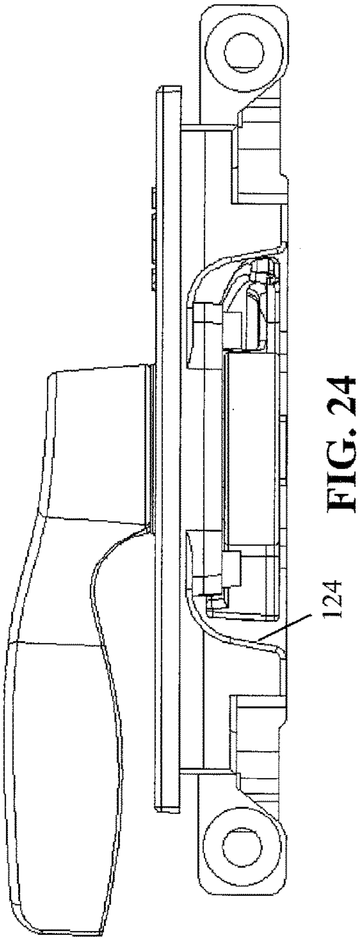
FIG. 24 is a front view of the sash lock assembly of FIG. 22A.
Figure 26:
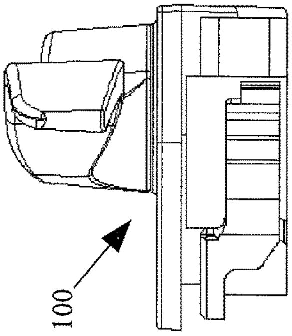
FIG. 26 is a left side view of the sash lock assembly of FIG. 22A.

The front wall 120 of the housing 110 may be formed to protrude away from the top wall 115, and may be generally perpendicular thereto. The front wall 120 may extend down a distance from the top wall 115 to a surface 120P that may be planar, and the front wall may have a generally central portion extend between a first end 121 and a second end 122. The ends 121 and 122 of the front wall 120 may fall just short of the ends 111 and 112 of the top wall, as may be seen in FIG. 5 and FIG. 7, so that the first end 111 and the second end 112 of the top wall may each overhang beyond those end points 111/112 of the front wall. The front wall 120 may be formed to have an opening 123, to accommodate movement of a portion of the cam out from the housing cavity when the shaft/handle member is actuated to pivot (see FIG. 22A and FIG. 22B). Therefore, the opening 123 may be generally centered with respect to the hole 116 in the top wall 115 (see FIG. 22B and FIG. 24). The front wall 120 may optionally include a first protruding extension 124*i* and a second protruding extension 124*ii* as shown in FIG. 5, each having an engagement surface 124Ei/124Eii positioned to respectively contact first and second portions of the front wall of the meeting rail when the sash lock is installed thereon (see e.g., FIG. 31), as discussed hereinafter. Each of the first protruding extension 124*i* and the second protruding extension 124*ii* may have a respective through hole 124Hi/124Hii to accommodate a screw that may be used to redundantly secure the sash lock to the front wall of the meeting rail. As seen in FIG. 7B, instead of the through holes 124Hi/124Hii to accommodate a screw, a respective pair of recesses 124Ri and 124Rii may be used, which may be used to drilled a through hole, after the sash lock has been installed, if screws are to by utilized.

The rear wall 125 of the housing 110 may have a straight center portion formed to be offset from the front wall (see FIG. 7 and FIG. 2), with a first end of the straight center portion being curved at 126 and transitioning into a first cantilevered portion 127, and with a second end of the rear wall being curved at 128 and transitioning into a second cantilevered portion 129. The curved portions 126/128 may serve to orient the first and second cantilevered portions 127 and 129 at a small acute angle θ with respect to the front wall 120, as seen in FIG. 7. Each of the cantilevered portions 127 and 129, which may be formed as mirrored copies of each other, may terminate in a "barb." Each barb, as seen in the enlarged view of FIG. 7A, may be formed to include a cam surface (e.g., 127C) and a first stop surface (e.g., 127Si), and may also include a second stop surface (e.g., 127Sii), and a tool removal surface (e.g., 127T) that may be formed as a notch. Note that as seen in FIG. 7B, the end of the cantilevered portions 127 and 129 may have respective recesses 127R and 129R.

Figure 4:
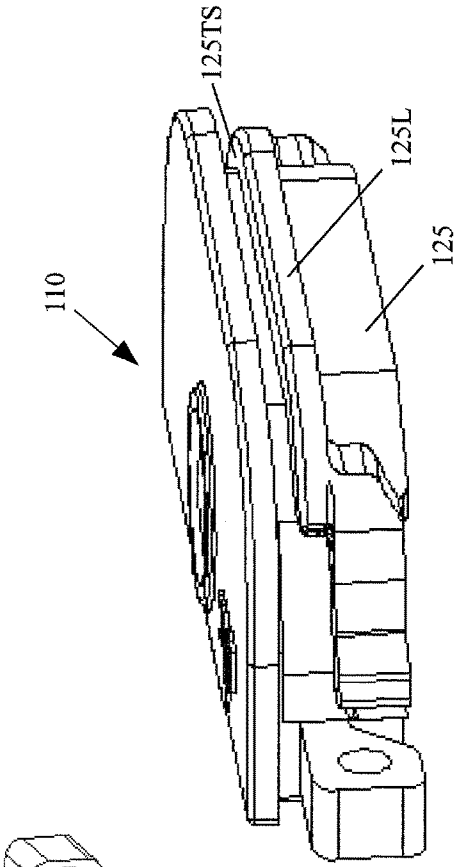
FIG. 4 is a side perspective view of the housing shown in FIG. 1.
Figures 5, 6, 7, 7A, 8, 9, 9A:
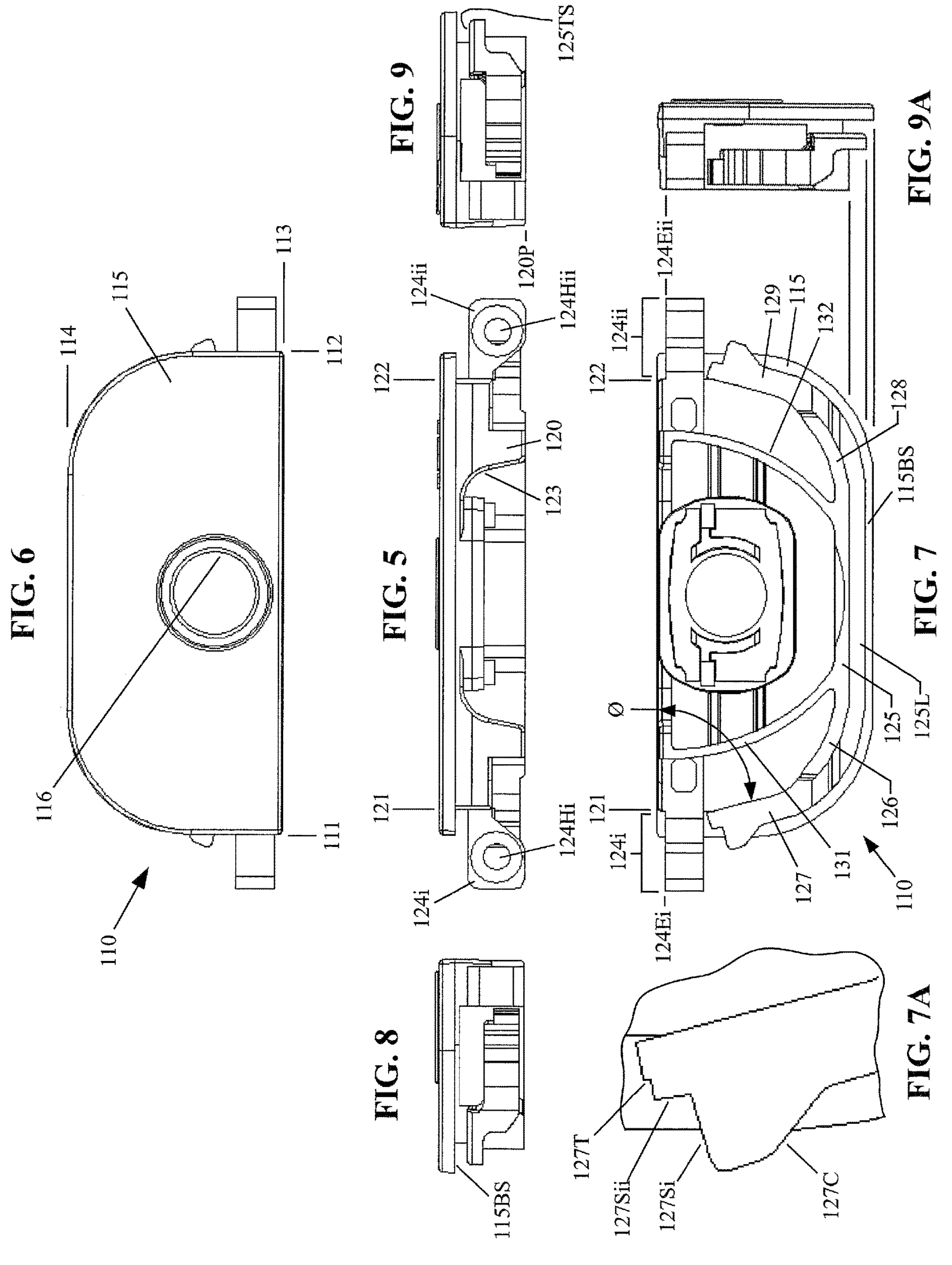
FIG. 5 is a front view of the housing shown in FIG. 1.
FIG. 6 is a top view of the housing shown in FIG. 1.
FIG. 7 is a bottom view of the housing shown in FIG. 1.
FIG. 7A is a view showing an enlarged portion of the bottom view of FIG. 7.
FIG. 8 is a left side view of the housing shown in FIG. 1.
FIG. 9 is a right side view of the housing shown in FIG. 1.
FIG. 9A is the right side view of FIG. 9, but shown rotated ninety degrees.
Figure 7B:
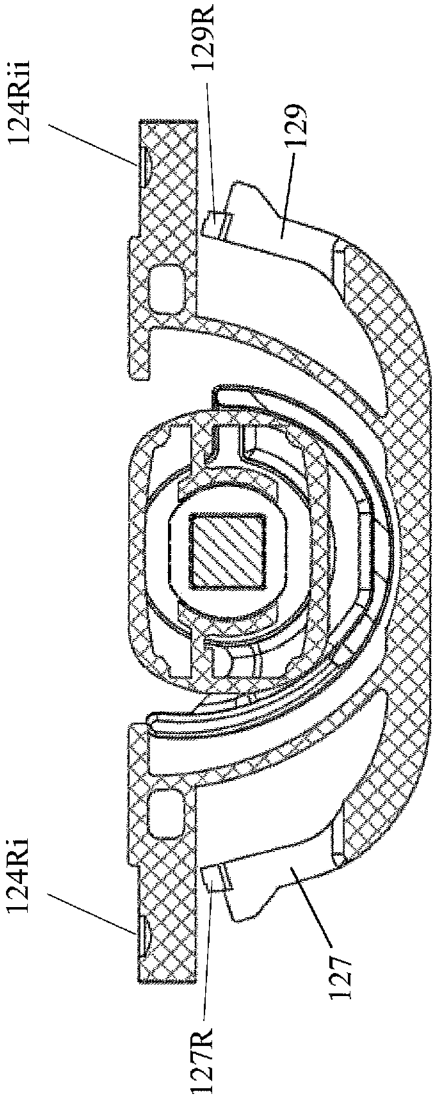
FIG. 7B shows an alternate embodiment of the housing of FIG. 7.
Figure 10:
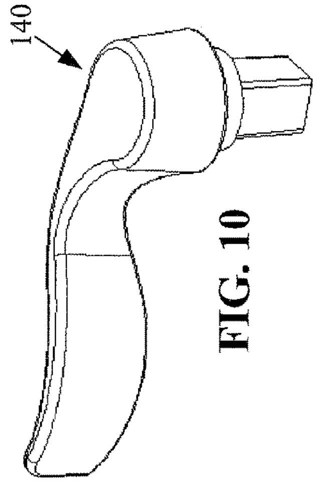
FIG. 10 is a perspective view of the shaft/handle member shown in FIG. 1.
Figure 15:
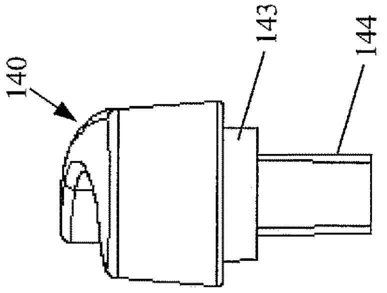
FIG. 15 is a right side view of the shaft/handle member shown in FIG. 10.
Figure 12:
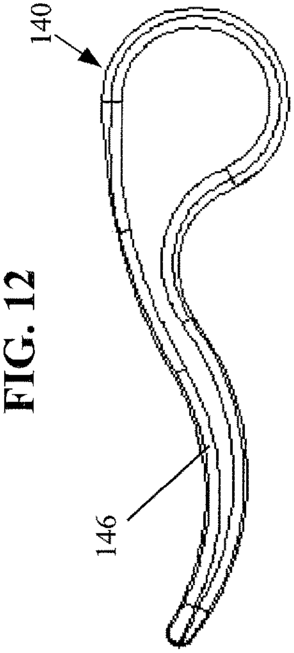
FIG. 12 is a top view of the shaft/handle member shown in FIG. 10.
Figure 11:
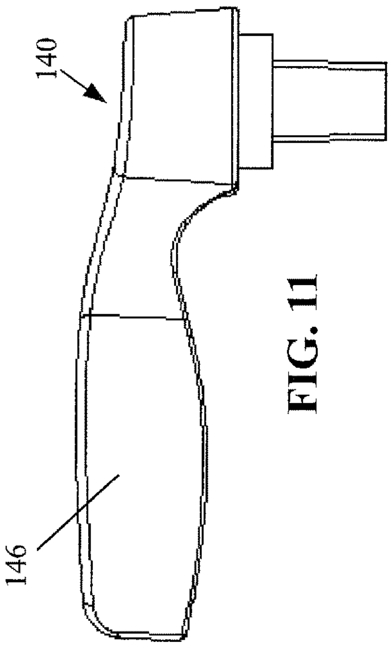
FIG. 11 is a front view of the shaft/handle member shown in FIG. 10.
Figure 13:
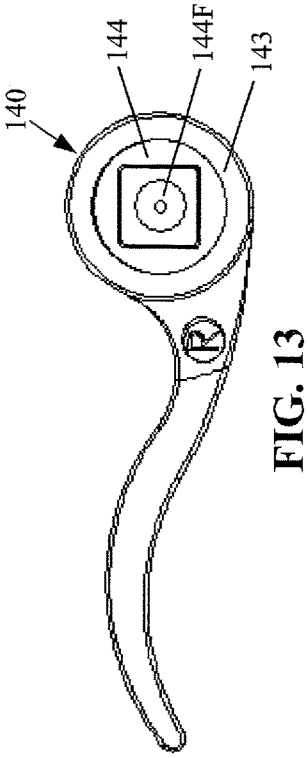
FIG. 13 is a bottom view of the shaft/handle member shown in FIG. 10.
Figure 14:
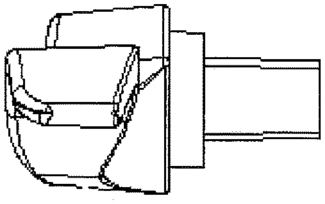
FIG. 14 is a left side view of the shaft/handle member shown in FIG. 10.
Figure 16:
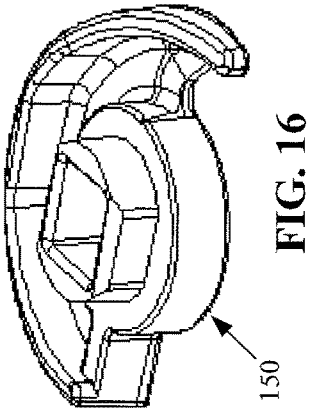
FIG. 16 is a perspective view of the cam shown in FIG. 1.
Figure 21:
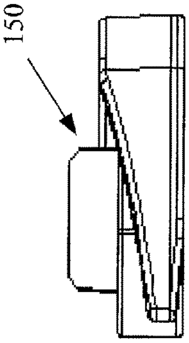
FIG. 21 is a right side view of the cam shown in FIG. 16.
Figure 18:
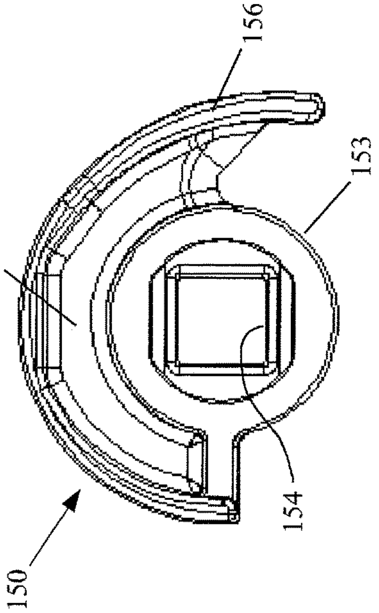
FIG. 18 is a top view of the cam shown in FIG. 16.
Figure 17:
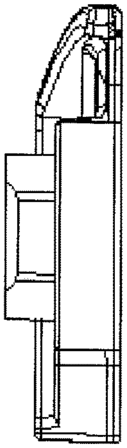
FIG. 17 is a front view of the cam shown in FIG. 16.
Figure 19:
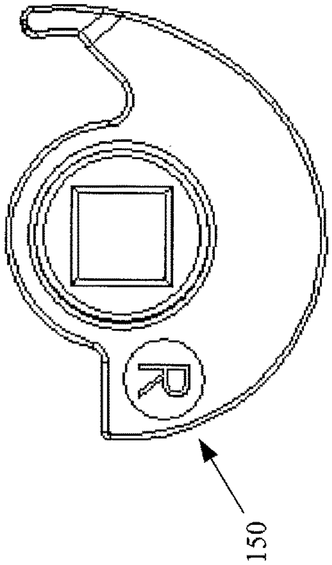
FIG. 19 is a bottom view of the cam shown in FIG. 16.
Figure 20:
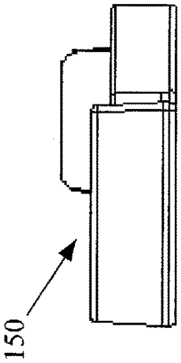
FIG. 20 is a left side view of the cam shown in FIG. 16.

Protruding from the rear wall 125 may be a lip 125L that may have a substantially flat top surface 125TS (see FIG. 9). The substantially flat top surface 125TS of the lip 125L may be parallel to, and offset a small distance from, the substantially flat bottom surface 115BS of the top wall 115, as seen in FIG. 8, FIG. 9, and FIG. 4. The housing may also have a pair of walls 131 and 132 that may extend from the straight center portion of rear wall 125 to the front wall 120 to form a smaller cavity region that may surround the cam 150 when it is installed therein, whereas the top wall 115, the front wall 120, and the rear wall 125 together may generally form a larger housing cavity that is not completely enclosed (see FIG. 2).

As seen in FIGS. 10-15, a shaft/handle member 140 may have a cylindrical shaft portion 143, one end of which may have a keyed protrusion 144 extending therefrom, with an orifice 144F formed in the shaft portion. In one embodiment, the other end of the shaft 143 may have a knob or other enlarged circular cross-sectional shape formed thereon to permit that end of the shaft to be easily grasped by the user, and in another embodiment, the other end of the shaft 143 may have an elongated graspable handle portion 146 that may extend generally orthogonally with respect to the axis of cylindrical shaft portion 143. The cylindrical shaft portion 143 may be configured to be pivotally mounted within the hole 116 of the housing 110. The keyed protrusion 144 may be any suitable cross-sectional shape, and in this example, the keyed protrusion is formed using the rectangular shape shown in FIG. 13.

The cam 150 is shown in FIGS. 16-21, and may have a cylindrical hub 153, with a keyed opening 154 that may be shaped to match the keyed protrusion 144 of the shaft/handle member 140. Extending laterally away from the hub 153 may be a wall 155, and extending laterally away from the wall 155 may be a curved cam wall 156, both of which may be used to engage and lock with respect to the key of a corresponding keeper, and to draw the sliding sash window in closer proximity to the master window frame (or to the other sash window for a double-hung arrangement). The opening 154 may be a through opening, so that the keyed protrusion 144 of the shaft/handle member 140 may be received therein, and the end of the protrusion may be sized and shaped to be bucked (i.e., upset) like a rivet, for securing of the cam 150 to the end of the shaft. Alternatively, opening 154 in the cam 150 may not be a through opening, and a screw may be received in the orifice 144F of the shaft/handle member 140 to secure the cam to the shaft/handle member. The cam 150 being so secured to the shaft/handle member 140 within the housing cavity is thereby pivotable in accordance with movement of the handle, being configured to pivot between a retracted position, and an extended position where a portion of the cam protrudes out from the opening in the front wall (FIG. 22B), as described above.

Figure 27:
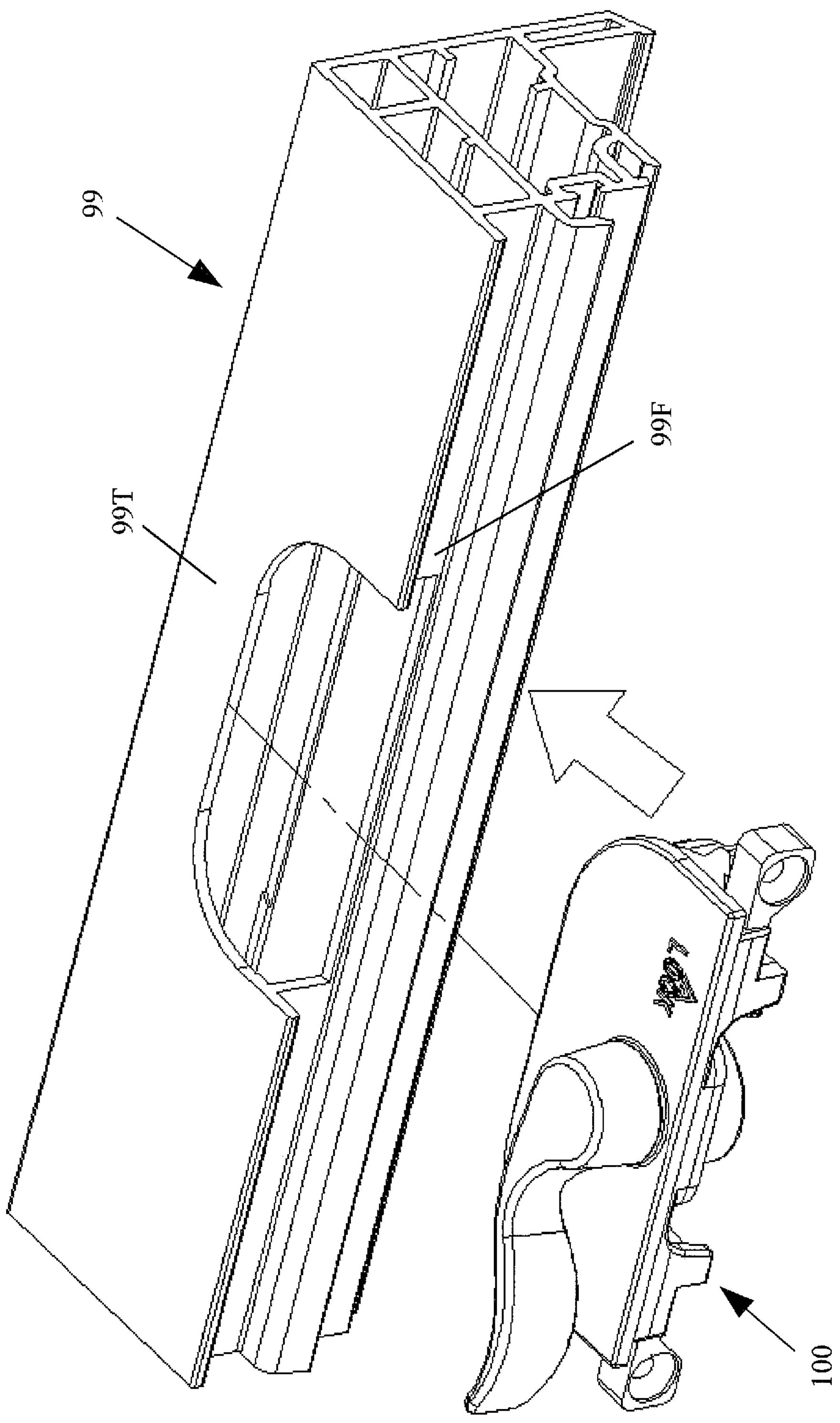
FIG. 27 is a perspective view showing the sash lock assembly of FIG. 22A, just prior to being installed on a meeting rail configured to receive the sash lock.
Figure 28A:
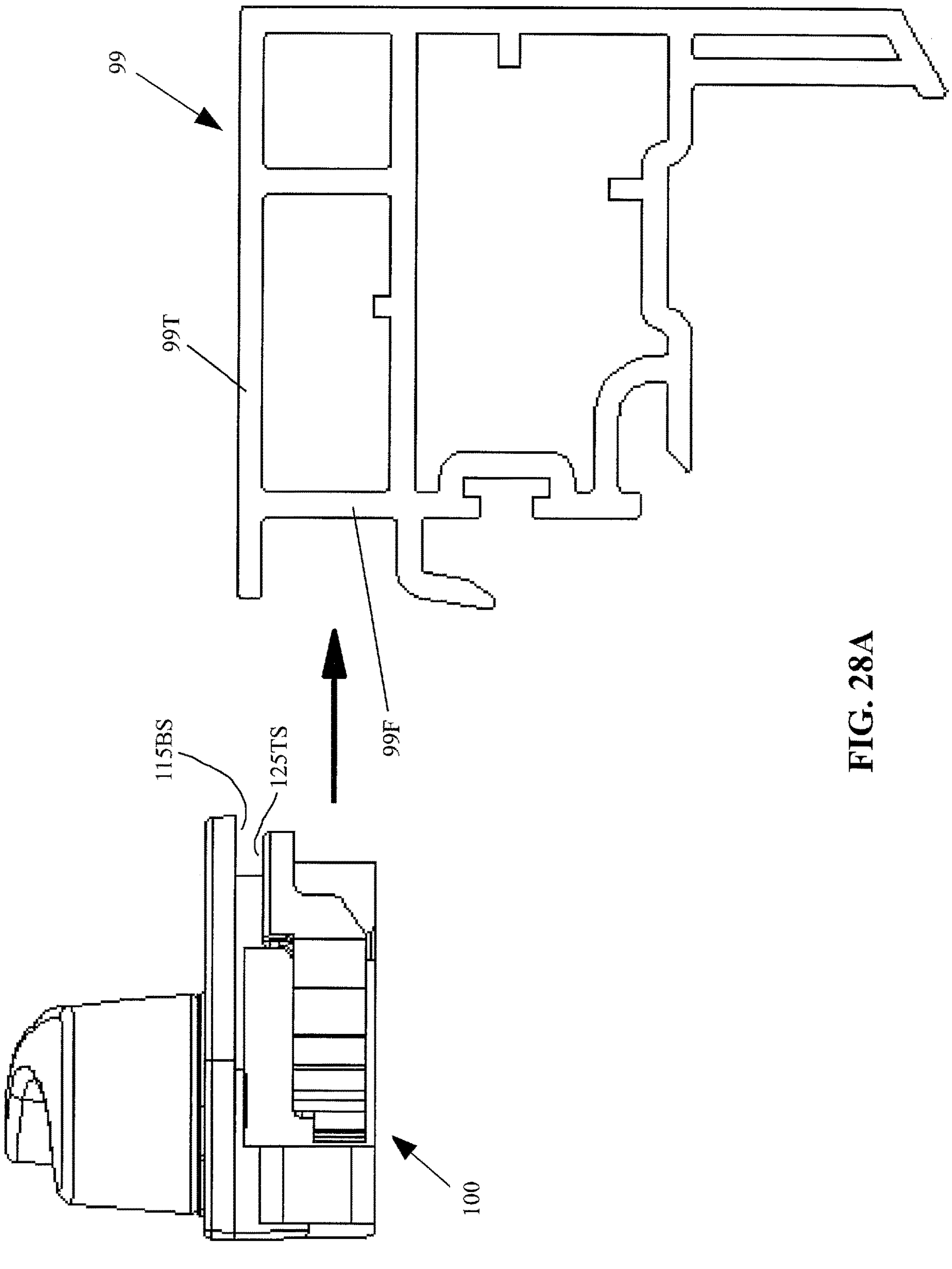
FIG. 28A is an end view showing the sash lock assembly of FIG. 22A, just prior to being installed on a meeting rail configured to receive the sash lock.
Figure 28B:
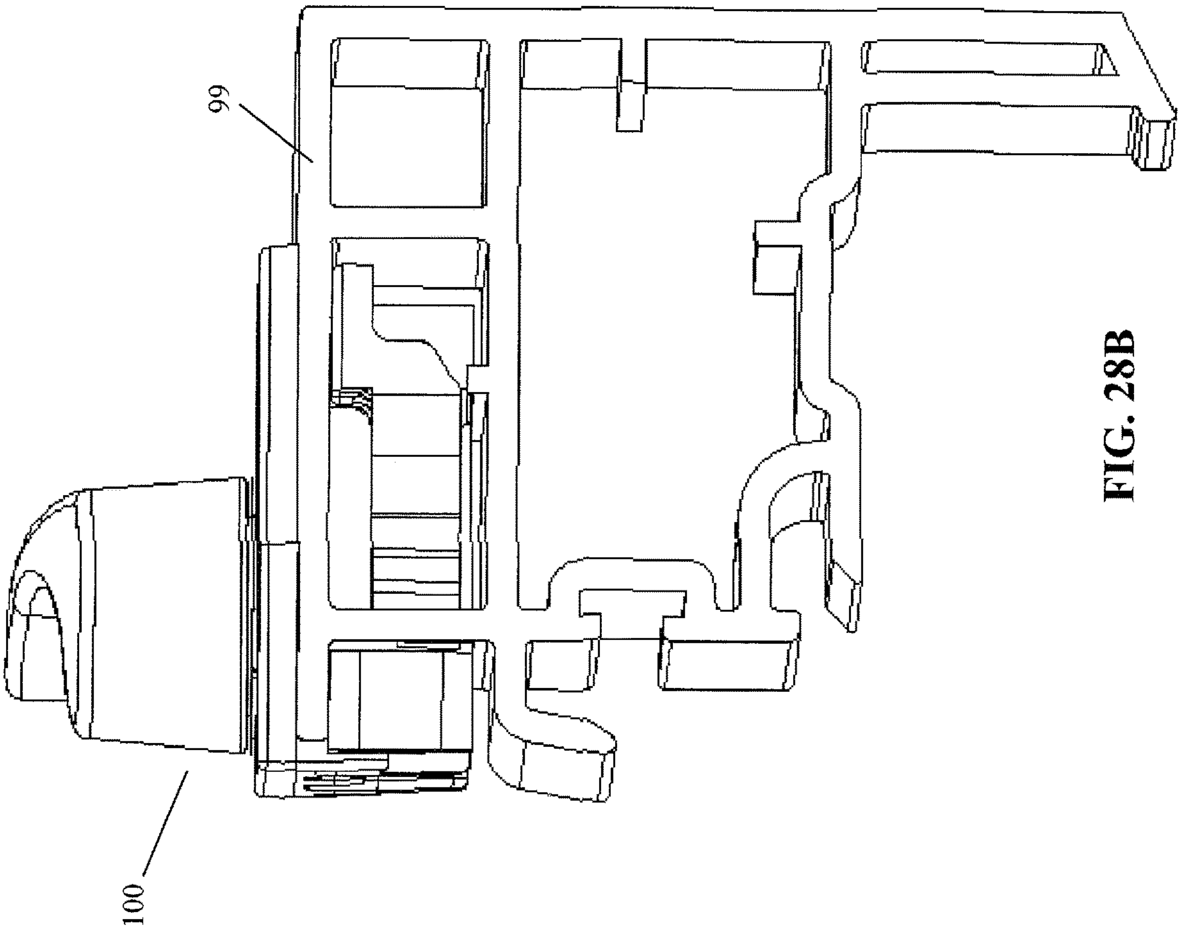
FIG. 28B is a perspective view showing the sash lock assembly of FIG. 22A, just after being installed on a meeting rail configured to receive the sash lock.

Installation of the sash lock assembly 100 onto the meeting rail 99 is shown in FIG. 27, FIGS. 28A-28B, and FIGS. 29A-29B. As seen in FIG. 27, the meeting rail 99 will have a particularly formed opening in a portion of the front wall 99F (e.g., a rectangular-shaped opening), and a particularly formed opening in a portion of the top wall 99T (e.g., a rectangular shape that may have rounded corners at it distal end), into which meeting rail portions the sash lock assembly 100 will be inserted.

Figure 29A:
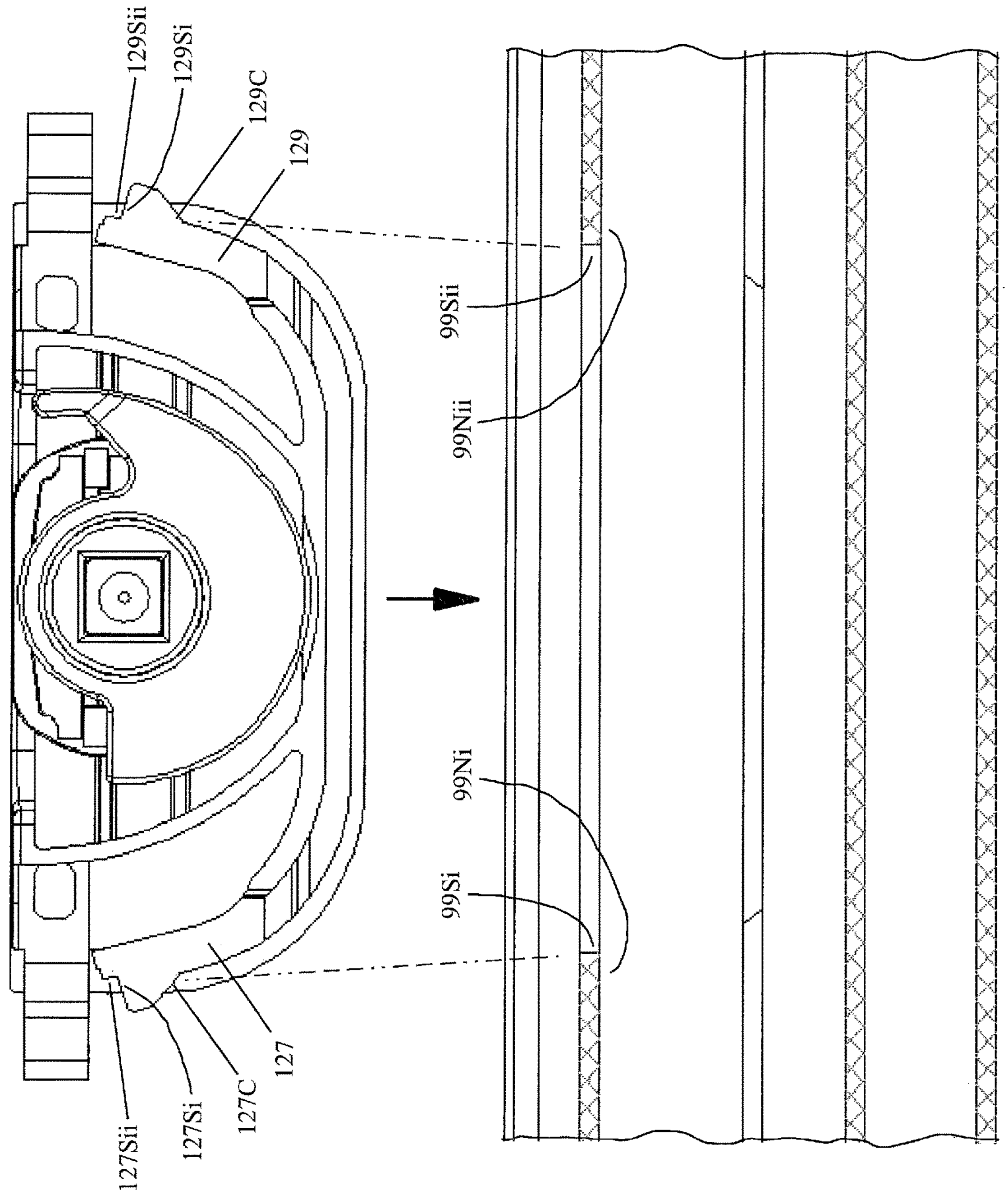
FIG. 29A is a bottom view of the sash lock assembly of FIG. 22A and a cross-sectional view through the corresponding meeting rail, with each being shown just prior to the sash lock being installed onto the meeting rail.
Figure 29B:
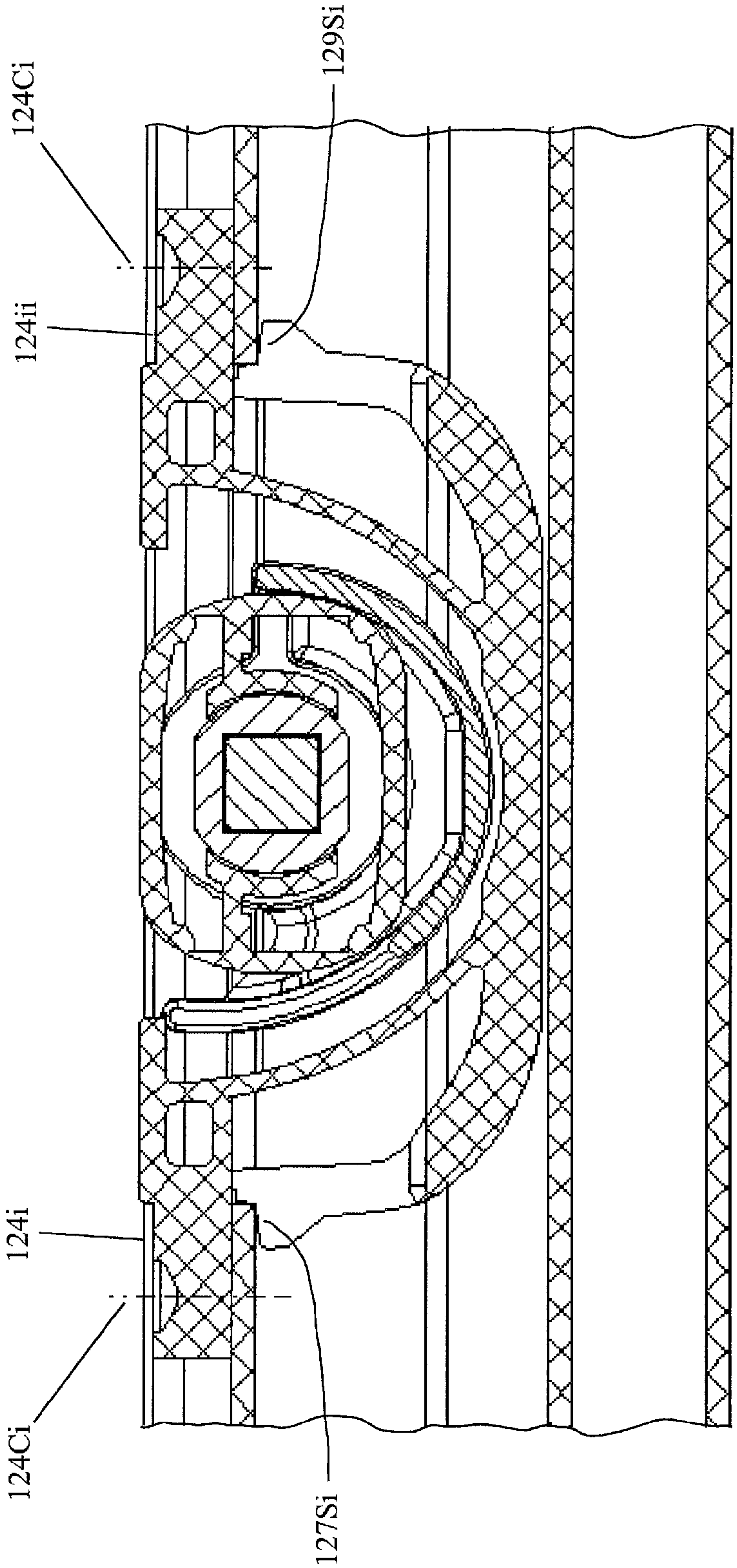
FIG. 29B is a cross-sectional view through the installed sash lock assembly and the corresponding meeting rail of FIG. 29A.
Figure 30A:
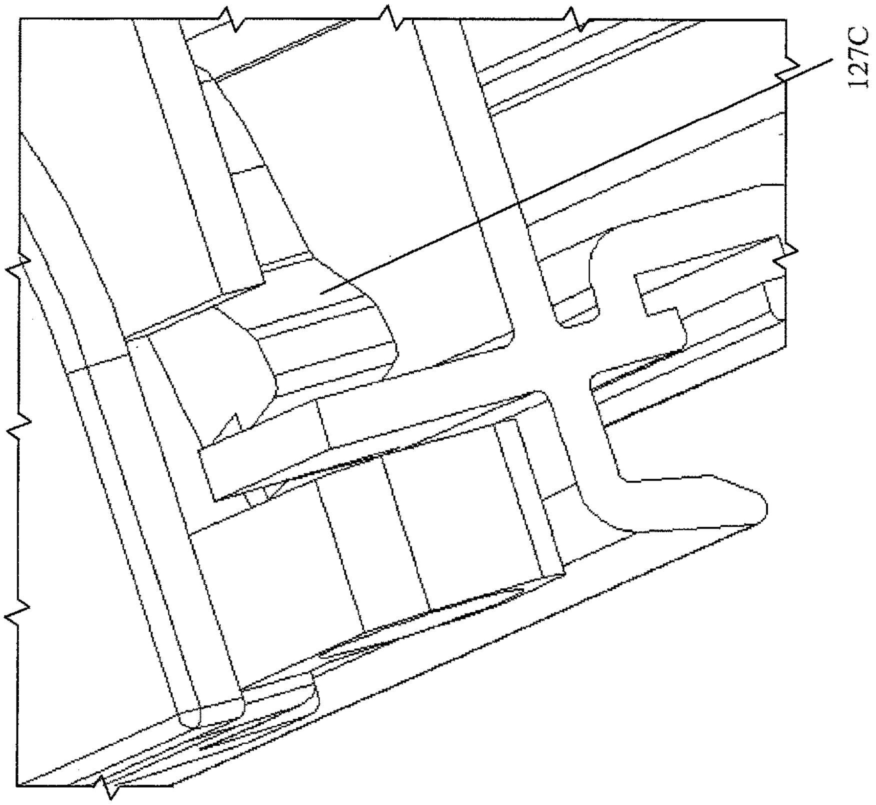
FIG. 30A shows an enlarged portion of the perspective view of FIG. 30.
Figure 30:
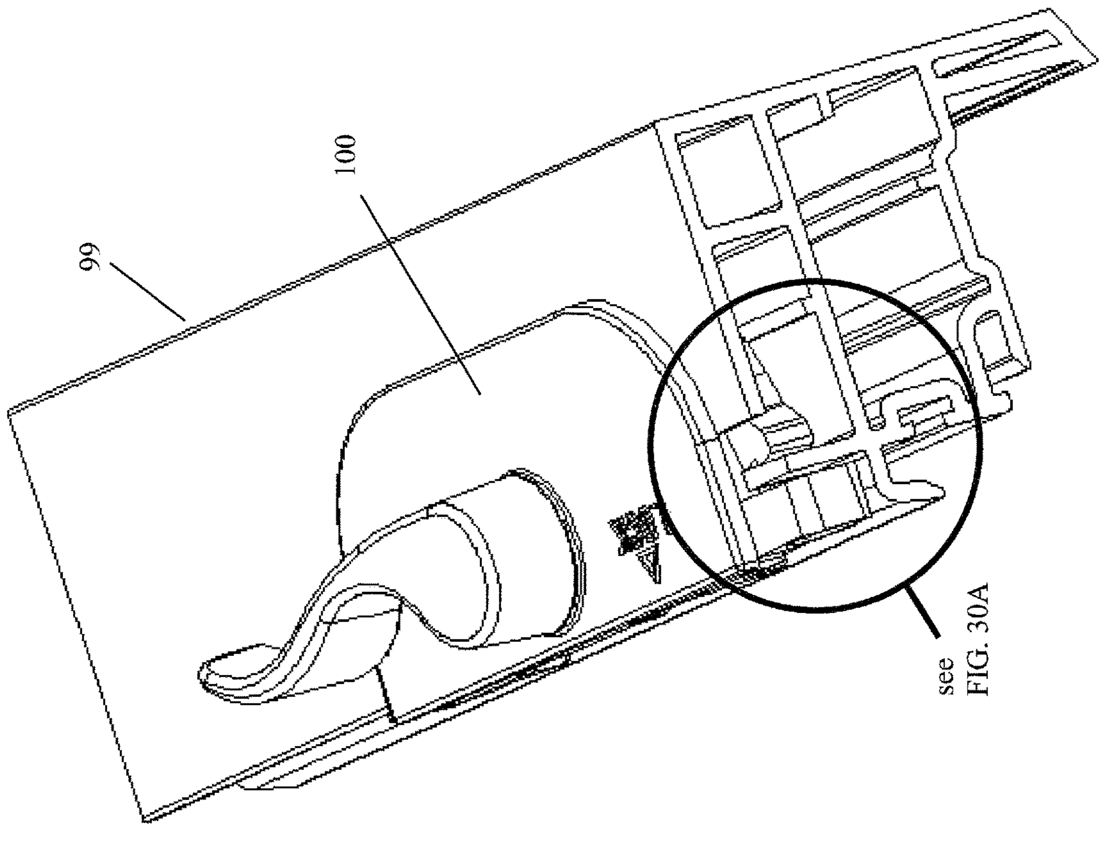
FIG. 30 is a perspective view showing the sash lock assembly of FIG. 22A, just after being installed on a meeting rail configured to receive the sash lock.

As may be understood from FIG. 29A, as the housing 110 of the sash lock assembly 100 is being inserted through those openings in the meeting rail 99, the cam surfaces 127C and 129C of the barbs on the housing 110 will contact the ends of the opening in the meeting rail 99 and be progressively deflected further inwardly, until the sash lock assembly is fully inserted into the opening. Once the sash lock assembly is fully inserted into the opening, each of the cantilevered portions 127 and 129 will be biased outwardly such that the contact surfaces 127Sii and 129Sii may each contact first and second side-facing surfaces 99Si and 99Sii of the front wall of the meeting rail 99, as seen in FIG. 29B. (Note that for the sash lock to be "fully inserted," in order for such outward biasing to occur, the force being applied to the housing of the lock may need to be sufficient to cause some deflection/deformation of the first protruding extension 124*i* and a second protruding extension 124*ii*). Also, after the sash lock 100 is fully inserted and the force is removed, the contact surfaces 127Si and 129Si of the cantilevered portions 127 and 129 may also thereby contact the interior surface portions 99Ni and 99Nii of the front wall of the meeting rail 99, and may thereby releasably prevent removal of the sash lock assembly 100 from it engagement with the meeting rail. Also, as the sash lock assembly 100 is being inserted into that installation position with respect to the meeting rail 99, the substantially flat bottom surface 115BS of the top wall 115 and the substantially flat top surface 125TS of the lip 125L may engage a top surface and a bottom surface of the top wall 99T of the meeting rail (see FIG. 28A and FIG. 28B). This "engagement" may be in the form of the top wall 99T of the meeting rail nesting between the substantially flat bottom surface 115BS of the top housing wall 115 and the substantially flat top surface 125TS of the lip 125L in either a friction (interference) fit, or a slight clearance fit.

Similarly, left and right side portions of the front wall 99F of the meeting rail 99 (i.e., portions on opposite sides of the opening in the front wall) may be respectively nested between (be engaged by) the first protruding extension 124*i* of the housing and the contact surface 127Si of the cantilevered portion 127 on one side, and between the second protruding extension 124*ii* and the contact surface 129Si of the cantilevered portion 129 on the other side (see FIG. 29B), which engagement may be a slight clearance fit or a friction (interference) fit. Although they are not required to completer installation of the sash lock 100, screws may be driven through the centers 124Ci/124Cii of the holes 124Hi/124Hii in the first and second protruding extensions 124*i* and 124*ii* of the front wall 120, to redundantly secure the sash lock assembly 100 to the meeting rail 99.

Figure 31:
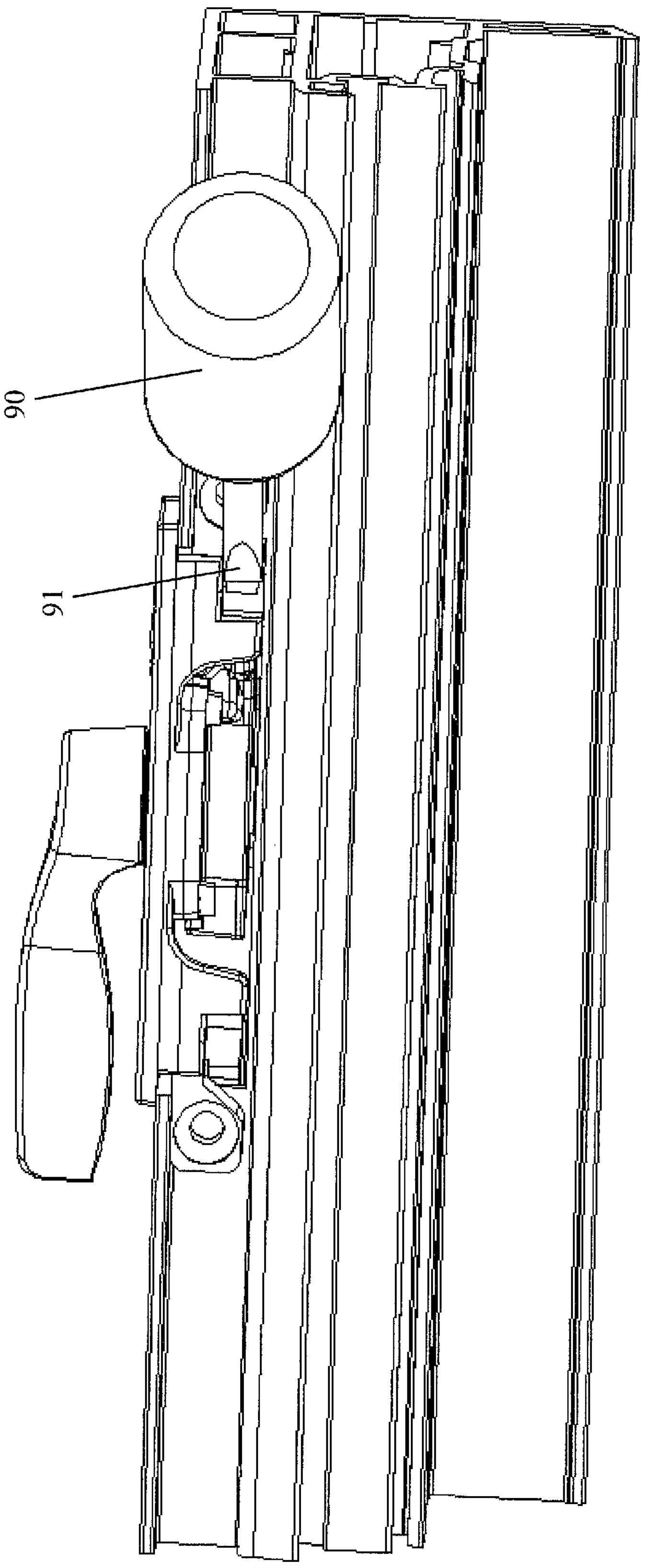
FIG. 31 is a perspective view of the sash lock assembly of FIG. 22A installed on the corresponding meeting rail, shown with a screwdriver blade being used to engage a tool removal surface of one of the cantilevered portions of said rear wall of the lock housing to cause it to deflect to permit disengagement and removal of the sash lock housing from the meeting rail.
Figure 32:
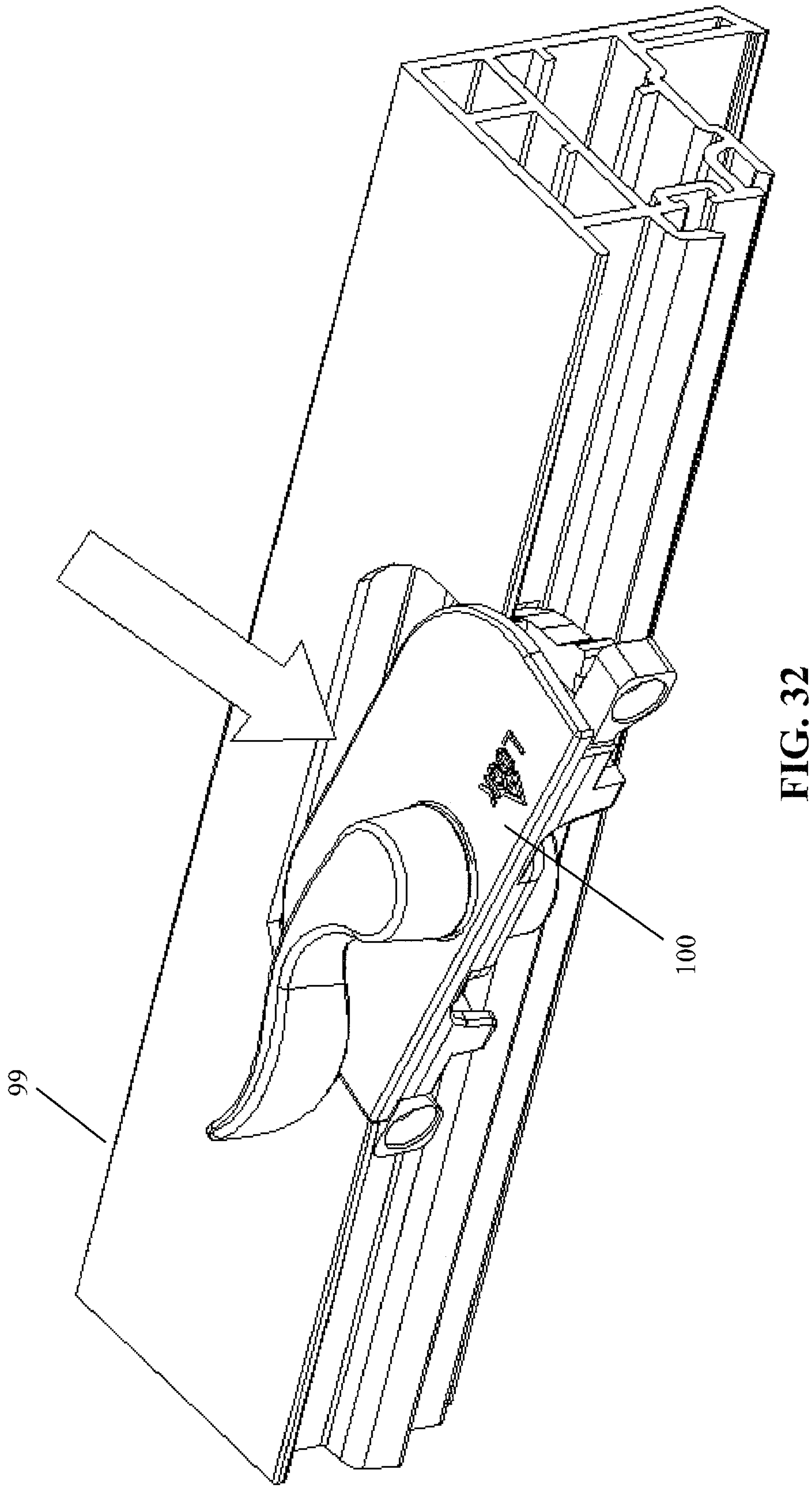
FIG. 32 is a perspective view of the sash lock assembly and the corresponding meeting rail of FIG. 31, shown with the sash lock initially being snapped out from its installed position on the meeting rail.
Figure 33:
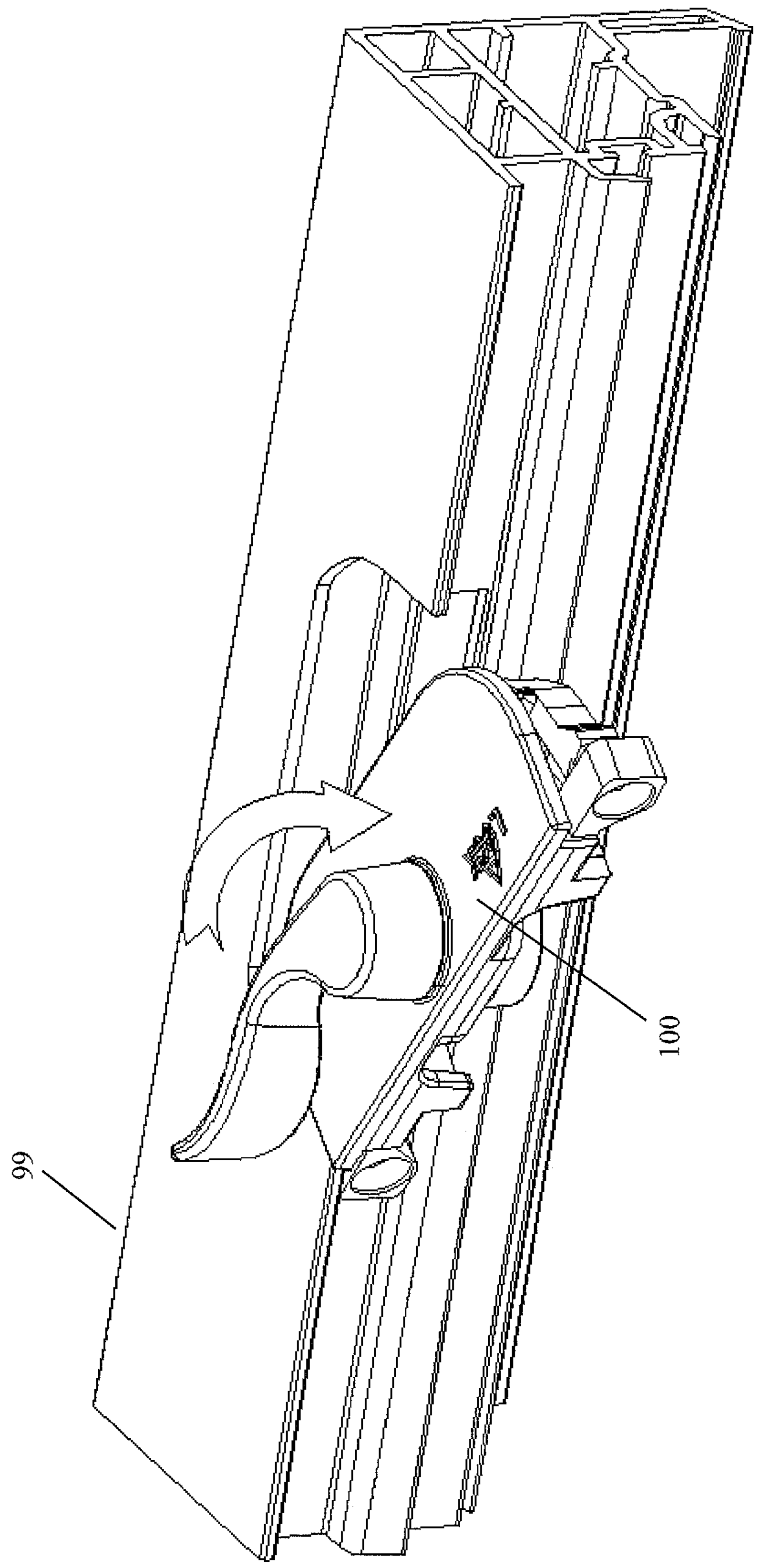
FIG. 33 is a perspective view of the sash lock assembly and the corresponding meeting rail of FIG. 32, shown with the sash lock after being further rotated away from its installed position on the meeting rail.
Figure 34A:
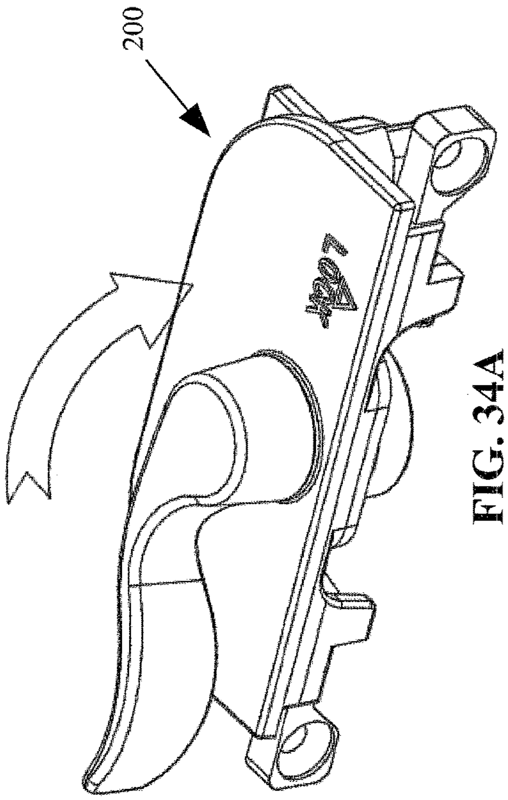
FIG. 34A and FIG. 34B are first and second perspective views of another sash lock embodiment.
Figure 34B:
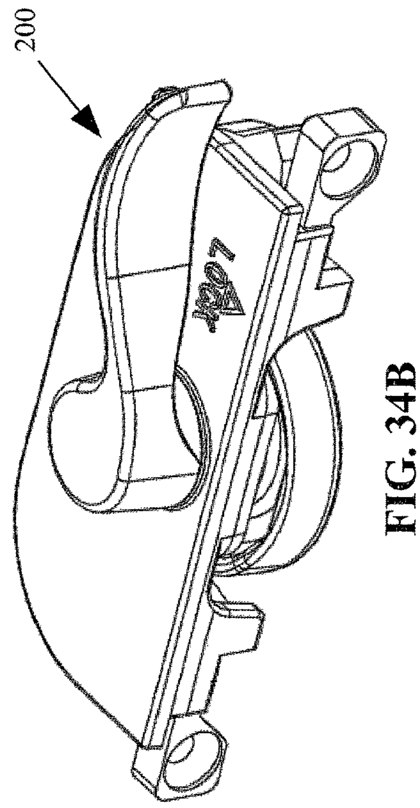
Figure 35:
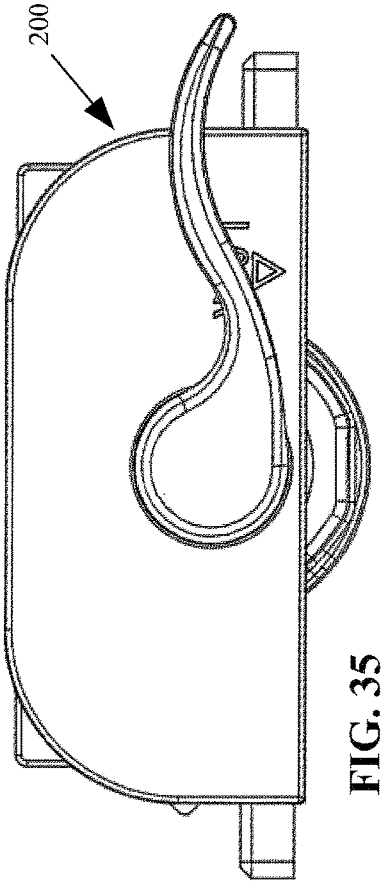
FIG. 35 is a top view of the sash lock assembly of FIG. 34A.
Figure 36:
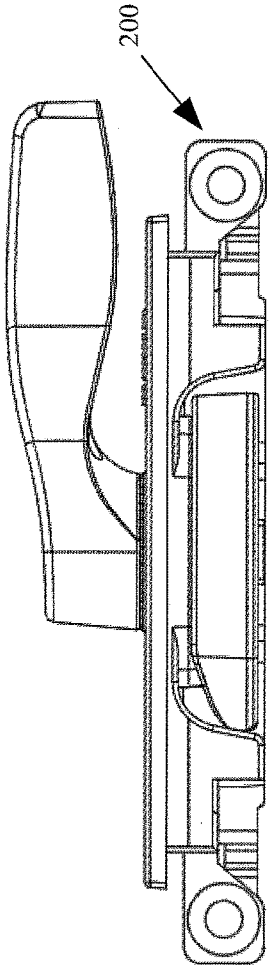
FIG. 36 is a front view of the sash lock assembly of FIG. 34A.
Figure 37:
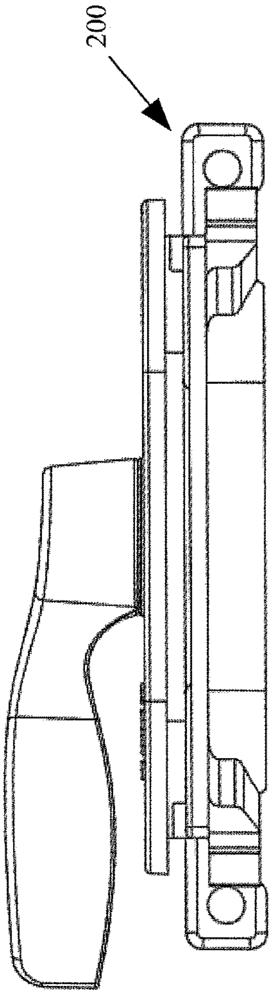
FIG. 37 is a rear view of the sash lock assembly of FIG. 34A.
Figure 38:
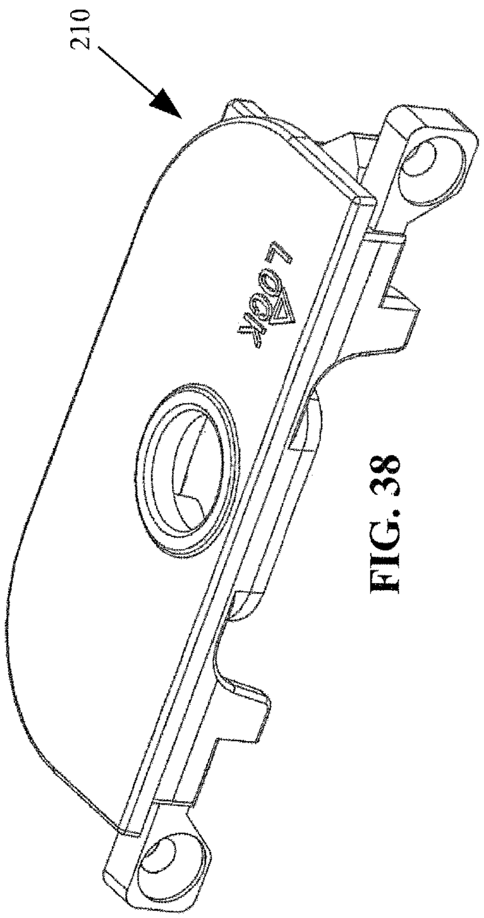
FIG. 38, FIG. 39, and FIG. 40 are first, second and third perspective views of the housing used to form the sash lock assembly of FIG. 34A.
Figure 39:
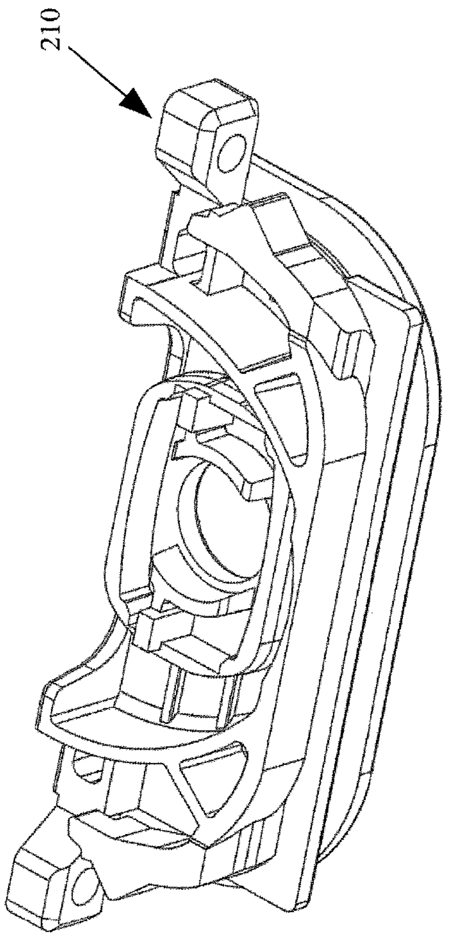
Figure 40:
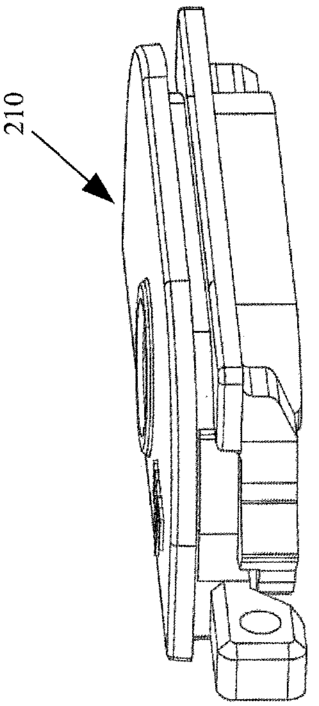
Figure 45:
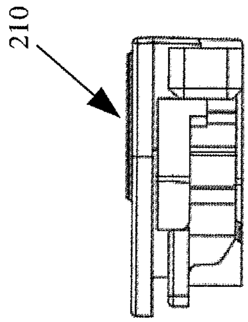
FIG. 45 is a right-side view of the housing used to form the sash lock assembly of FIG. 34A.

As seen in FIG. 31, a tool such as the end of the blade 91 of a screwdriver 90 may be used to contact and apply a force to the tool removal surface 127T on the barb of one of the cantilevered portions (127 or 129), to overcome the biasing provided by that cantilevered portions and deflect/deform it, to effect removal of the sash lock assembly from the meeting rail 99, as shown in FIGS. 32-33.

Note that the housing 110 may be used with many other different sash locks that utilize different cam configurations and/or different shaft/handle member configurations.

Figure 41:
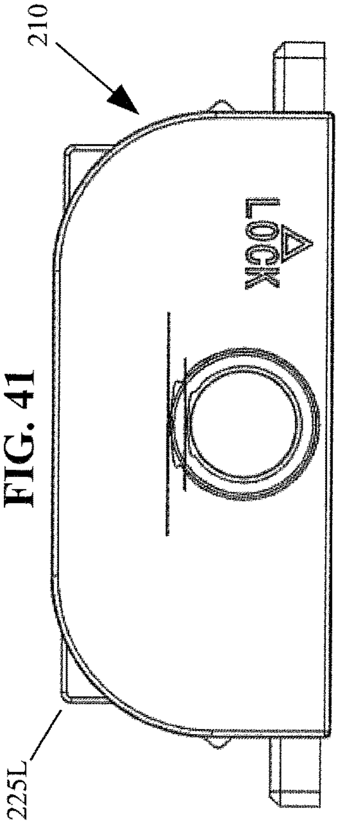
FIG. 41 is a top view of the housing used to form the sash lock assembly of FIG. 34A.
Figure 42:
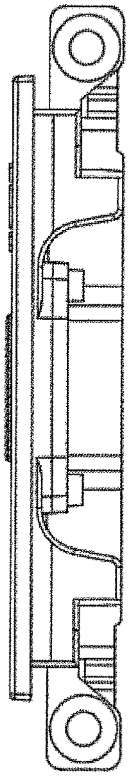
FIG. 42 is a front view of the housing used to form the sash lock assembly of FIG. 34A.
Figure 43:
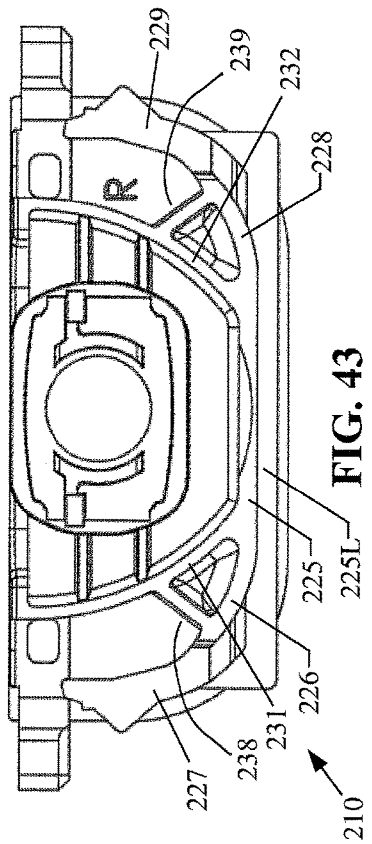
FIG. 43 is a bottom view of the housing used to form the sash lock assembly of FIG. 34A.
Figure 44:
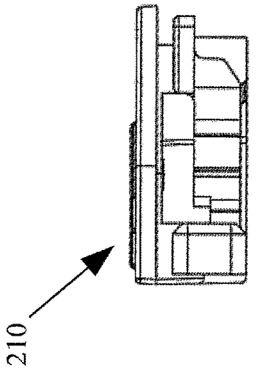
FIG. 44 is a left-side view of the housing used to form the sash lock assembly of FIG. 34A.

FIG. 34A, FIG. 34B, and FIGS. 35-37 show views of another sash lock embodiment, sash lock assembly 200. The sash lock assembly 200 may be formed substantially similar to the sash lock assembly 100, but may instead use the housing 210 shown in FIGS. 38-43. The housing 210 may be formed substantially the same as the housing 110, with several notable differences that are reflected in those figures. The housing 210 may have a lip 225L protruding from the wall 225 that may be generally rectangular, with rounded corners, as seen in FIG. 41 and FIG. 43. Stiffeners 238 and 239 may respectively extend from the walls 231 and 232 and may interconnect with curved wall portions 226 and 228, respectively, to provide additional support for the cantilevered members 227 and 229, thereby reducing the cantilever distance.

Figure 43A:
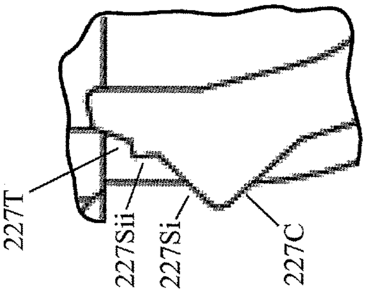
FIG. 43A is a view showing an enlarged portion of the bottom view of FIG. 43.
Figure 46:
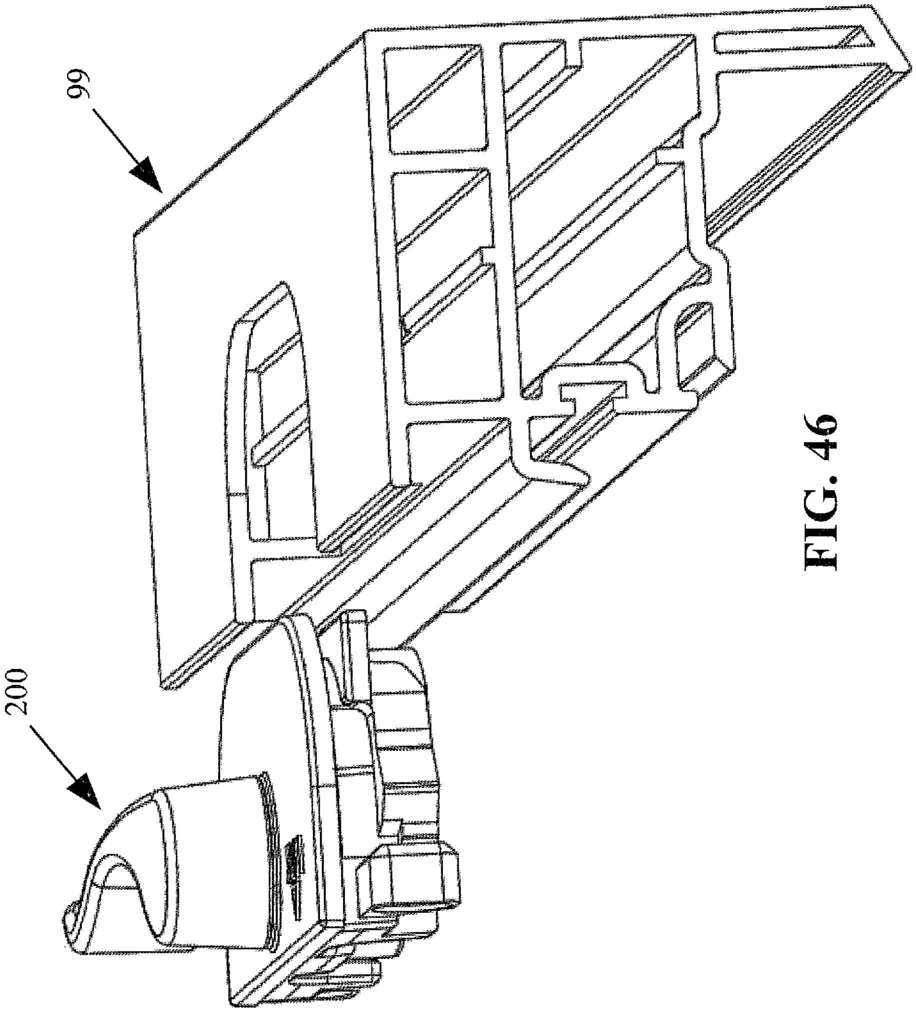
FIG. 46 is a perspective view showing the sash lock assembly of FIG. 34A, just prior to being installed on a meeting rail configured to receive the sash lock.

Each of the cantilevered portions 227 and 229 may similarly terminate in a "barb." Each barb, as seen in the enlarged view of FIG. 43A, may be formed to include a cam surface (e.g., 227C) and a first stop surface (e.g., 227Si), and may also include a second stop surface (e.g., 227Sii), and a tool removal surface (e.g., 227T) that may be formed as a notch or the angled surface as shown in FIG. 43A. These surfaces may engage the meeting rail to retain the sash lock in the installed position thereon.

While illustrative implementations of one or more embodiments of the disclosed system are provided hereinabove, those skilled in the art and having the benefit of the present disclosure will appreciate that further embodiments may be implemented with various changes within the scope of the disclosed system. Other modifications, substitutions, omissions and changes may be made in the design, size, materials used or proportions, operating conditions, assembly sequence, or arrangement or positioning of elements and members of the exemplary embodiments without departing from the spirit of this invention.

Accordingly, the breadth and scope of the present disclosure should not be limited by any of the above-described example embodiments, but should be defined only in accordance with the following claims and their equivalents.

The invention claimed is:

1. A sash lock, said sash lock configured for screwless installation of a portion thereof with respect to an opening in a meeting rail of a sash window, said sash lock comprising:

a housing, said housing comprising:

a top wall; at least a portion of said top wall comprising a flat bottom surface; said top wall comprising: a hole;

a front wall, said front wall comprising an opening; and a rear wall; a first end of said rear wall comprising: a first cantilevered portion; a second end of said rear wall comprising: a second cantilevered portion; said rear wall comprising: a lip; said lip comprising: a flat top surface being parallel and adjacent to said flat bottom surface of said top wall;

a shaft, said shaft rotatably mounted to said hole;

a cam, said cam secured to said shaft within said housing cavity, and thereat being pivotable between a retracted position, and an extended position where a portion of said cam protrudes out from said opening in said front wall;

wherein said lip and said flat bottom surface of said top wall are spaced apart a distance configured to cause respective engagement with a top surface and a bottom surface of a top wall of the meeting rail; and wherein said first and second cantilevered portions of said rear wall are configured to respectively engage an inside surface of first and second portions of the meeting rail, to maintain said respective engagement between the top wall of the meeting rail and each of: said lip and said flat bottom surface of said top wall of said housing.

2. The sash lock according to claim 1, wherein a first portion of said front wall comprises a first flat engagement surface configured to engage an outside surface of the side wall of the meeting rail, and releasably nest the first portion of the side wall of the meeting rail between said first portion of said front wall and said first cantilevered portion of said rear wall.

3. The sash lock according to claim 2, wherein a second portion of said front wall comprises a second flat engagement surface configured to engage the outside surface of the side wall of the meeting rail, and releasably nest the second portion of the side wall of the meeting rail between said second portion of said front wall and said second cantilevered portion of said rear wall.

4. The sash lock according to claim 3, wherein each of said first cantilevered portion and said second cantilevered portion comprises a barb; said barb comprising:

a cam surface, said cam surface configured to cause deflection of each respective said cantilevered portion when said sash lock is being engaged with the meeting rail; and a contact region, said contact region configured for said engagement between each of said first and second cantilevered portions of said rear wall and the inside surface of the first and second portions of the side wall of the meeting rail.

5. The sash lock according to claim 4, wherein said barb comprises a tool removal surface configured to receive a screwdriver blade to deflect one of said first and second cantilevered portions of said rear wall to cause disengagement and removal of said sash lock housing from the meeting rail.

6. The sash lock according to claim 5, wherein said rear wall comprises: a first curved portion and a second curved portion;

wherein said first cantilevered portion extends away from said first curved portion towards said front wall; and wherein said second cantilevered portion extends away from said second curved portion towards said front wall.

7. The sash lock according to claim 6, wherein said front wall comprises: one or more holes each configured to receive a fastener to redundantly secure said sash lock to the meeting rail.

8. A sash lock housing, said sash lock housing configured for screwless installation of a portion thereof with respect to an opening in a meeting rail of a sash window, said sash lock housing comprising:

a top wall; at least a portion of said top wall comprising a flat bottom surface;

a front wall, said front wall comprising an opening;

a rear wall, a first end of said rear wall comprising a first cantilevered portion, and a second end of said rear wall comprising a second cantilevered portion; said rear wall comprising: a lip; said lip comprising: a flat top surface being parallel and adjacent to said flat bottom surface of said top wall;

wherein said lip and said flat bottom surface of said top wall are spaced apart a distance configured to cause respective engagement with a top surface and a bottom surface of a top wall of the meeting rail; and wherein said first and second cantilevered portions of said rear wall are configured to respectively engage an inside surface of first and second portions of the meeting rail, to maintain said engagement between the top wall of the meeting rail and each of: said lip and said flat bottom surface of said top wall of said housing.

9. The sash lock housing according to claim 8, wherein a first portion of said front wall comprises a first flat engagement surface configured to engage an outside surface of the side wall of the meeting rail, and releasably nest the first portion of the side wall of the meeting rail between said first portion of said front wall and said first cantilevered portion of said rear wall.

10. The sash lock according to claim 9, wherein a second portion of said front wall comprises a second flat engagement surface configured to engage the outside surface of the side wall of the meeting rail, and releasably nest the second portion of the side wall of the meeting rail between said second portion of said front wall and said second cantilevered portion of said rear wall.

11. The sash lock housing according to claim 10, wherein each of said first cantilevered portion and said second cantilevered portion comprises a barb; said barb comprising:

a cam surface, said cam surface configured to cause deflection of each respective said cantilevered portion when said sash lock housing is being engaged with the meeting rail; and a contact region, said contact region configured for said engagement between each of said first and second cantilevered portions of said rear wall and the inside surface of the first and second portions of the side wall of the meeting rail.

12. The sash lock housing according to claim 11, wherein said barb comprises a tool removal surface configured to receive a screwdriver blade to deflect one of said first and second cantilevered portions of said rear wall to cause disengagement and removal of said sash lock housing from the meeting rail.

13. The sash lock housing according to claim 12, wherein said rear wall comprises: a first curved portion and a second curved portion;

wherein said first cantilevered portion extends away from said first curved portion towards said front wall; and wherein said second cantilevered portion extends away from said second curved portion towards said front wall.

14. The sash lock housing according to claim 13, wherein said front wall comprises: one or more holes each configured to receive a fastener to redundantly secure said sash lock housing to the meeting rail.

15. A method of securing a sash lock housing to a meeting rail of a sash window without using fasteners, said method comprising:

forming a first opening in a front surface of a front wall of the meeting rail;

forming a second opening in a top surface of a top wall of the meeting rail;

forming a housing with a top wall having a flat bottom surface, a front wall with an opening, and a rear wall with a first cantilevered portion at a first end and a second cantilevered portion at a second end and a lip having a flat top surface being parallel and adjacent to the flat bottom surface;

forming the lip and the flat bottom surface of the top wall spaced apart a distance;

inserting the housing through the first opening in the front wall of the meeting rail and nesting the top wall of the meeting rail between the lip and the flat bottom surface of the top wall of the housing, until the first cantilevered portion and the second cantilevered portion respectively engage an inside surface of first and second portions of the front wall of the meeting rail, thereby securing the sash lock housing to the meeting rail of the sash window.

* * * * *